United States Patent [19]
Erskine

[11] Patent Number: 5,943,132
[45] Date of Patent: Aug. 24, 1999

[54] MULTICHANNEL HETERODYNING FOR WIDEBAND INTERFEROMETRY, CORRELATION AND SIGNAL PROCESSING

[75] Inventor: David J. Erskine, Oakland, Calif.

[73] Assignee: The Regents of the University of California, Oakland, Calif.

[21] Appl. No.: 09/019,107

[22] Filed: Feb. 5, 1998

Related U.S. Application Data

[63] Continuation-in-part of application No. 08/720,343, Sep. 27, 1996, Pat. No. 5,872,628.

[51] Int. Cl.[6] ........................................ G01B 9/02
[52] U.S. Cl. ............................. 356/349; 356/345
[58] Field of Search .................... 356/349, 345, 356/346

[56] References Cited

U.S. PATENT DOCUMENTS 5,642,194   6/1997   Erskine .................................... 356/345

*Primary Examiner*—Robert H. Kim
*Attorney, Agent, or Firm*—John P. Wooldridge

[57] ABSTRACT

A method of signal processing a high bandwidth signal by coherently subdividing it into many narrow bandwidth channels which are individually processed at lower frequencies in a parallel manner. Autocorrelation and correlations can be performed using reference frequencies which may drift slowly with time, reducing cost of device. Coordinated adjustment of channel phases alters temporal and spectral behavior of net signal process more precisely than a channel used individually. This is a method of implementing precision long coherent delays, interferometers, and filters for high bandwidth optical or microwave signals using low bandwidth electronics. High bandwidth signals can be recorded, mathematically manipulated, and synthesized.

28 Claims, 31 Drawing Sheets

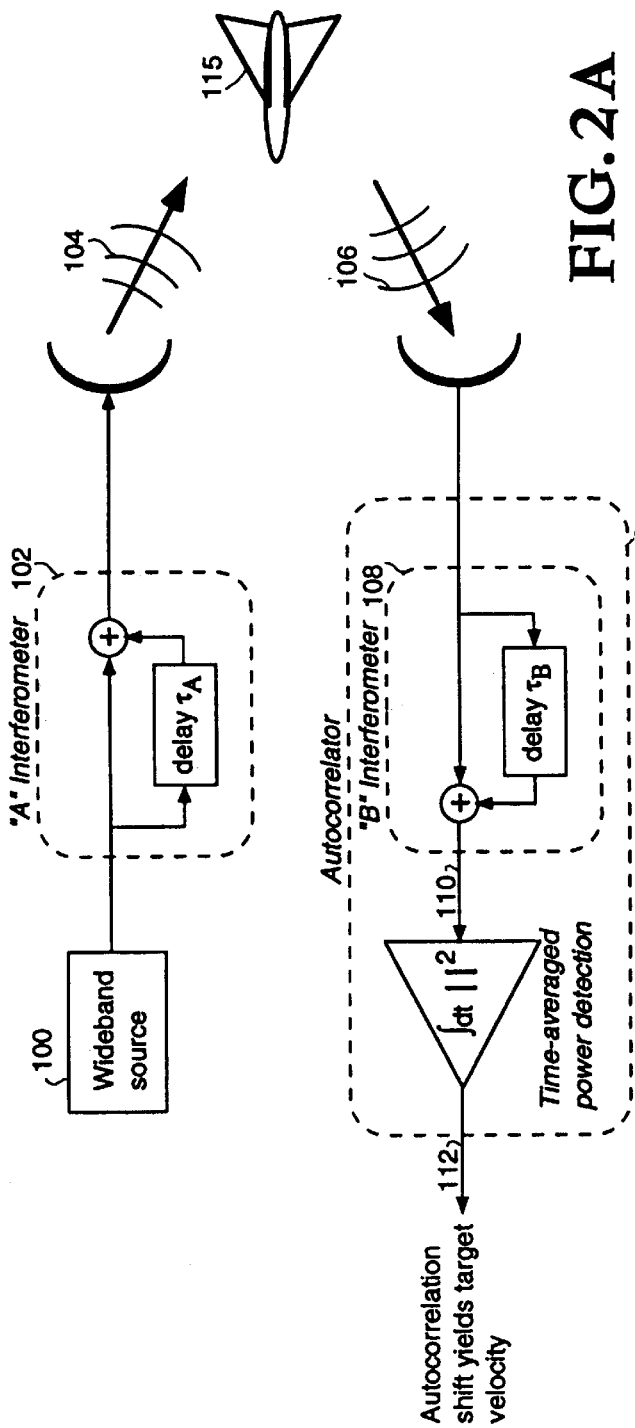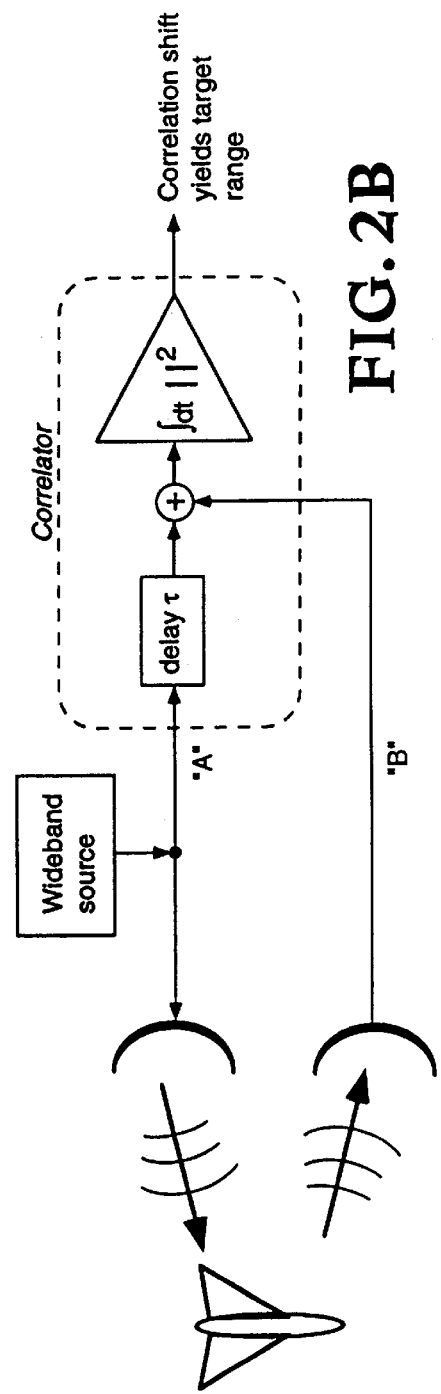

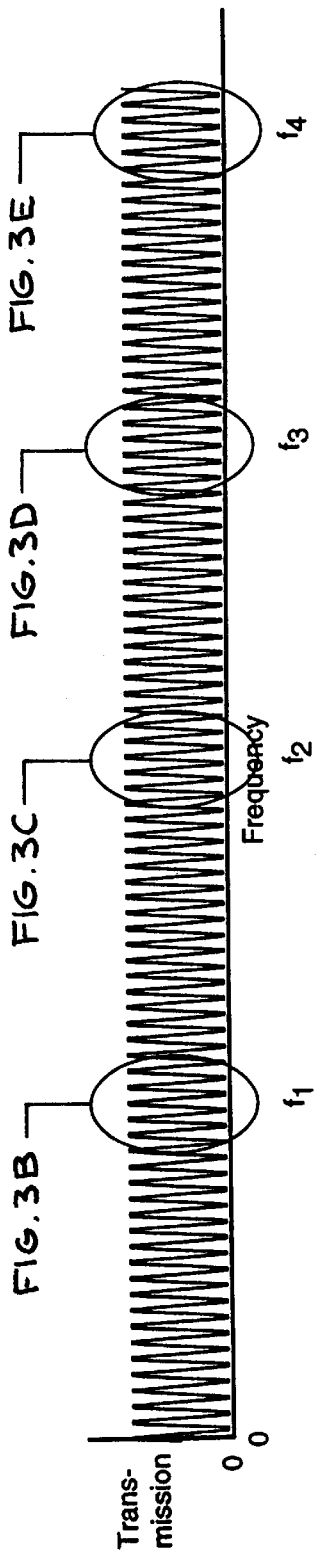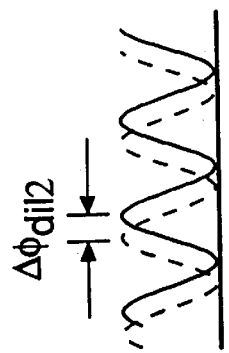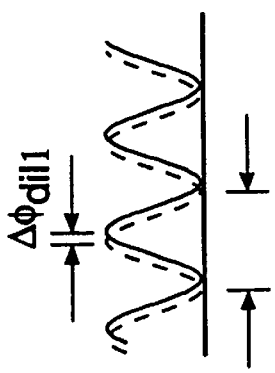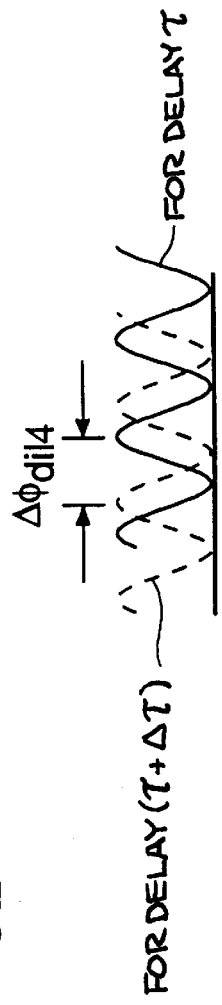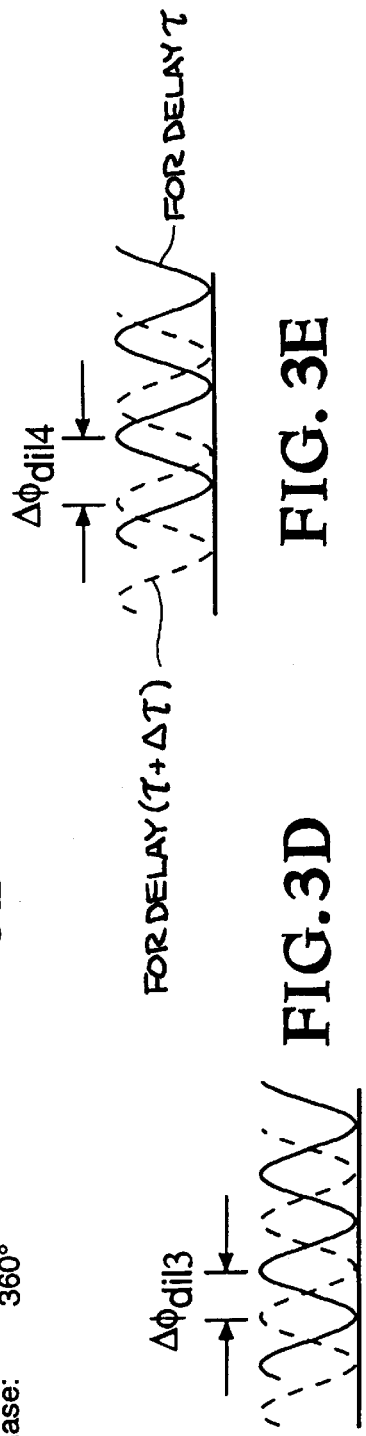

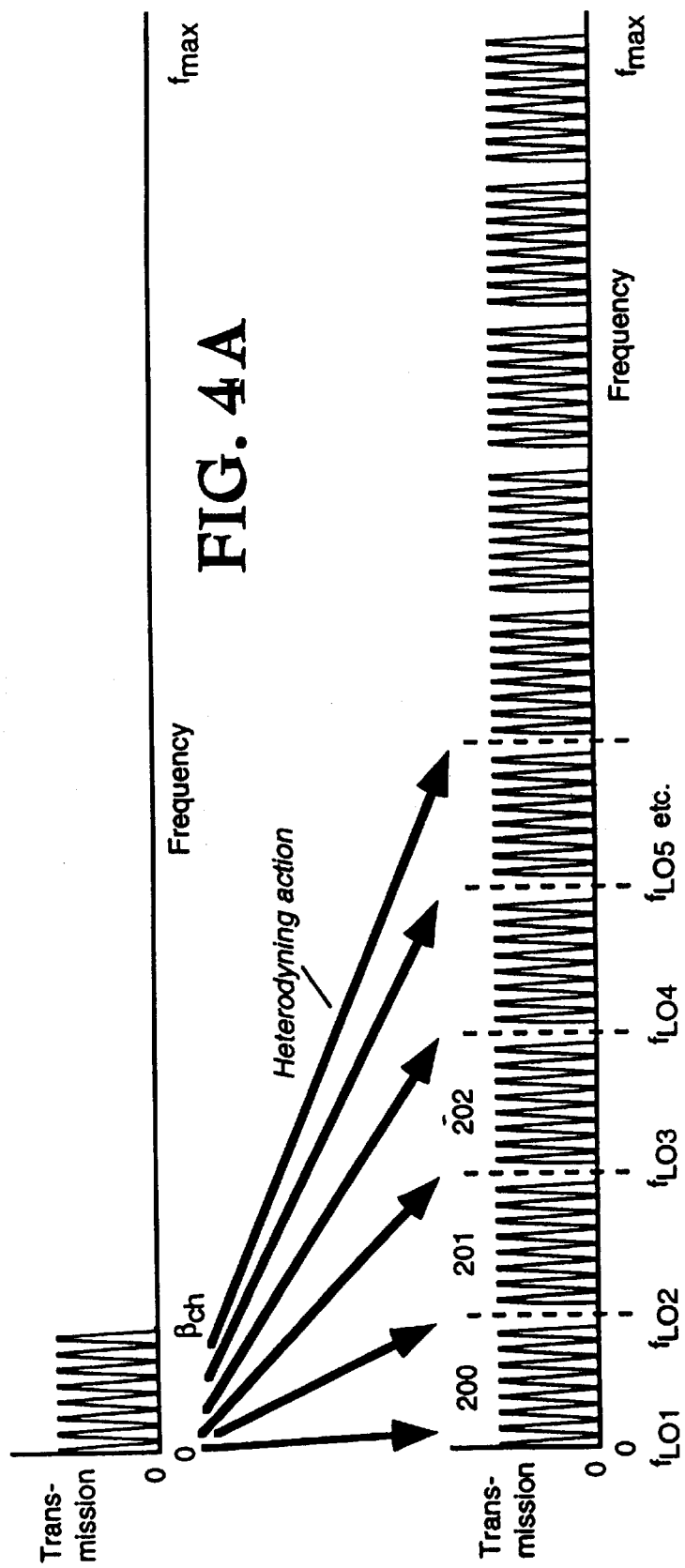

MULTICHANNEL HETERODYNING FOR WIDEBAND INTERFEROMETRY, CORRELATION AND SIGNAL PROCESSING

This is a continuation-in-part of U.S. patent application Ser. No. 08/720,343, filed on Sep. 29, 1996, incorporated herein by reference.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to interferometry, correlation and autocorrelation of wide bandwidth signals, and more specifically the coherent conversion of wide bandwidth signals to a set of many lower frequency signals and subsequent parallel signal processing.

2. Description of Related Art

Electromagnetic waves such as microwaves and light, and ultrasound waves are widely used for echolocation, velocimetry and imaging. These techniques involve signal processing such as correlation, interferometry, time delaying, filtering, recording and waveform synthesis. Currently, many of these applications use fairly monochromatic waves having a long coherence length. If instead wide bandwidth waves are used, an increased precision of the location and velocity of the target results due to the illumination's shorter coherence length. U.S. Pat. No. 5,642,194, titled "White Light Velocity Interferometer" and U.S. patent application Ser. No. 08/720,343, titled "Noise Pair Velocity and Range Echo-Location System", both incorporated herein by reference, describe how two interferometers nearly matched in delay can be used with wide bandwidth illumination to measure target velocity using processes of interferometry and autocorrelation (FIG. 2A). The wideband illumination can be used to measure target range using the process of correlation (FIG. 2B). These processes of interferometry, correlation and autocorrelation require coherent delays. For microwave radars, the delays are chosen to be several milliseconds to match radar pulse repetition rates, which in turn are set by the desired maximum target range of hundreds of kilometers. Several milliseconds is a long delay compared to the period of the wave, which could be 30 picoseconds. Electronics, and particularly digital electronics, is the most attractive method of creating long delays, as well as for performing general signal processing. The challenge is that the bandwidths found in microwave and optical signals can greatly exceed the capability of easily available electronics.

For example, suppose we wish to construct a device using 10–30 GHz microwaves having a bandwidth of 20 GHz, using interferometers of 2 ms delay. (This could provide meter/sec velocity measurement and ~1 cm range resolution.) It is impractical to create such a long delay by analog cable, because the cable length required is hundreds of km, and serious attenuation and dispersion of the signal would result, in addition to the impractical weight and cost of the cable. A digital delay line consisting of an analog-digital converter (A/D), shift register, and digital-analog converter (D/A) can easily create a 2 millisecond delay. However, the 20 GHz input signal bandwidth greatly exceeds the bandwidth capability of commonly available digital electronics, which may be closer to 0.2 GHz.

The bandwidth of optical signals can be even much higher than microwaves and thus even further beyond the capability of current electronics. (Optical velocimeters having long delays are useful for measuring extremely slow velocities.) In spite of lower weight of optical fiber, a spool of fiber hundreds of km long is still large and expensive, and the attenuation and dispersion through such a length would force the use of repeaters, further increasing cost and weight.

In addition to velocimetry, applications for correlating wide bandwidth optical signals abound in astronomy, for creating long baseline optical telescopes analogous to radio telescope arrays. These could increase the angular resolution by orders of magnitude over current optical telescopes. The challenge here is to correlate two or more optical signals received many hundreds of kilometers apart. Propagating a weak optical signal through long optical fibers brings severe attenuation and dispersion, losing the phase information required for correlations. Digitally encoding the time varying optical field (amplitude and phase) was not feasible previously.

A high bandwidth requirement can also come from the use of multiple input data streams which need to be correlated to form a 2-dimensional image. Such is the case of an ultrasound imaging device using multiple detectors (transducers) and using wideband illumination (to reduce speckle). While a single detector produces a 1 to 10 MHz bandwidth signal, which is low enough to be processed by a single channel of electronics, a matrix of 100 such detectors requires calculating a large number of correlation combinations. This can exceed real-time processing capacity.

FIGS. 2A, 2B, and 2C show applications for interferometry, autocorrelation and correlation. FIG. 2A shows a double interferometer velocimeter, which is also called a "white light" velocimeter for optical waves (see U.S. Pat. No. 5,642,194) and a "noise pair" radar for microwave waves (See U.S. patent application Ser. No. 08/720,343). Waves from a wideband source 100 pass through an interferometer 102 labeled "A" having a delay $\tau_A$. This imprints a coherent echo on the source to form an illumination beam 104, which is sent to a target 115. The presence of the coherent echo causes a comb-filter shape to the power spectrum of waves 104. The waves 106 reflected from the target are Doppler shifted by the target velocity, which dilates the comb-filter spectrum slightly. The reflected waves pass through a second interferometer 108 labeled "B" having a delay $\tau_B$ and which imposes its own comb-filter pass spectrum. This creates a detected wave 110. The time-averaged power 112 of the detected wave is measured versus delay $\tau_B$ to form an autocorrelation. The autocorrelation will have a peak for delays $\tau_B \approx \tau_A$. This is because the maximum amount of power will pass through the "B" interferometer when its spectrum matches the Doppler shifted spectrum of the "A" interferometer. Let the position of the peak be $\tau_p$. For target velocity v, and for a target reflecting light 180° back toward the apparatus, the autocorrelation peak shift is proportional to velocity, $\tau_p - \tau_A = (2v/c)\tau_A$, where c is the wave speed. Thus very long delay times produce sensitive velocity detection. The advantage of high bandwidth for the source 100 is a smaller coherence length, which makes the autocorrelation peak narrower, reducing velocity ambiguity. This allows resolving velocities of multiple targets.

An interferometer is a device that coherently sums an applied signal with a delayed replica. It is a filter with a power transmission spectrum which is sinusoidal, as shown in FIG. 3A, ideally given by $T=(\frac{1}{2})[1+\cos(\omega\tau+\text{const})]$, where "const" is a constant, $\omega=2\pi f$ is the angular frequency, and τ the interferometer delay. This kind of spectrum is also called a "comb-filter". FIG. 3B shows a close-up of the sinusoidal peaks having a periodicity 1/τ in frequency units and 360° in phase units. (The periodicity of the sinusoids in these Figures is exaggerated for clarity. For example, a 2 ms delay interferometer would have 2 ms×20 GHz=40 million peaks from 10 GHz to 30 GHz.)

Note that it is the structure of the comb-filter on the scale 1/τ which produces the velocity measuring effect. Spectral changes much broader and much narrower than 1/τ do not significantly affect the phase of the fringes. Thus a less-than-ideal interferometer that broadly modifies the spectrum of the applied signal can still be used, as well as one having slightly non-uniform spacing (phase) of comb peaks, provided both "A" and "B" interferometers share the same non-uniformity.

FIG. 2B shows an application of high bandwidth signals to find the range of a target, and FIG. 2C to measure the angle of a target by the difference in arrival times of a wave at two antenna spaced well apart (such as in radio astronomy). These applications both create a correlation between two signals "A" and "B". The position (in delay-space) of the correlation peak yields the range or angle information. Again, the advantage of using a high bandwidth source is to create a narrow correlation peak, which reduces ambiguity of the measurement.

In addition to correlations and interferometry, other signal processes which benefit from high bandwidth are the recording and synthesis of waveforms. The time resolution of these processes is given by the reciprocal of the bandwidth, so high bandwidth allows for the shortest time resolution.

SUMMARY OF THE INVENTION

It is an object of the present invention to provide techniques for coherently combining a set of low bandwidth signal processing channels to form a collective high bandwidth signal processing device.

A high bandwidth reference signal, which in many embodiments is provided by a set of oscillators conventionally called local oscillators (LO), but could also be a single mode-locked signal having many harmonics, provides the synchronization that preserves the coherence between channels. The phase relationship between the multiple channels is set to precisely define the temporal response of the net device. In this way, for the cases of interferometer, filter, autocorrelator, correlator, or delay-line signal processes which involve a characteristic delay time τ, the effective value of τ can be controlled with much higher precision than by a single channel used alone.

The method of the invention could be called "multichannel heterodyning, or "multiheterodyning", and can be used to interfere, correlate, autocorrelate, delay, filter, record and synthesize waveforms, as well as combinations of those processes. The philosophy is to subdivide the input signal spectrum into many narrow bands (channels) which are shifted to a lower frequency (called an intermediate frequency, (IF)) by heterodyning against a set of reference frequencies ($f_{LO}$), one per channel. Both the phase and amplitude information of the original input frequency components can be preserved in the heterodyning. The overall signal process desired for the input signal is applied individually to each channel. The channel spectra are spectrally re-assembled by a second heterodyning process which shifts the frequencies upward to form a net high bandwidth output signal, or in the case of correlation and autocorrelation processes the net time-averaged power is computed and summed over all channels, omitting the up-heterodyning step. In autocorrelation, correlation, interferometry, or delay, each channel process spectra (FIG. 4A) is similar for all channels. Then the net spectrum (FIG. 4B) comprises a set of these 200, 201, 202, translated upward in frequency via heterodyning to fill the input bandwidth. The channel spectra could also be individualized to create a non-periodic spectrum (FIG. 4C).

Since the phase and amplitude of the input frequency components can be determined through the down-heterodyning process, the entire Fourier spectrum of the input signal (real and imaginary parts across the full input bandwidth) can be recorded, by recording each individual channel and re-assembling the spectral information at a later time. (Optimal recording desires the channel bandshapes to contiguously fill the input bandwidth shoulder-to-shoulder). Knowledge of the full-band Fourier spectrum is a complete description of the input signal.

For real-time processes, any arbitrary filtering process that can process each frequency component independent of the others can be implemented by the invention. (An example of a process that is inappropriate is a non-linear process where widely separated high and low frequency components are expected to mix and form sum or difference frequency output terms. Such pairs are not easy to form in real-time for the invention because the high and low input frequencies are segregated into separate channels.) However, the combination of recording an input signal, manipulating its recorded Fourier spectrum mathematically in any arbitrary way, and then synthesizing the output signal provides powerful flexibility in creating a wide variety of signal processes, including the aforementioned non-linear processes which require mixing of widely separated frequency components.

The advantage of the invention is that it allows the use of inexpensive, low bandwidth and low frequency signal processing components such as digital electronics, to manipulate signals having much higher bandwidth and frequency. This is especially important for the creation of very long coherent time delays for high bandwidth microwave and optical signals. Such long time delays are needed to construct velocimeters and range-finders using short coherence length illumination, which offer advantages of simultaneous unambiguous velocity and range determination, and lack of confusing speckle.

A great practical advantage of the invention occurs for applications involving comparison of two signals when a set of reference frequencies can be shared between two multi-heterodyning apparatuses. This comparison can be a correlation between two received signals to determine angle of a radar or optical target, or the correlation of a transmitted and reflected signal to determine range, or the autocorrelation of a reflected signal previously imprinted with an echo by an interferometer to determine target velocity. When two multiheterodyning apparatuses share the same reference frequencies the comparison process is insensitive to the detail values of those frequencies. This allows the reference frequencies to drift slowly with time, such as due to thermal drift. This can dramatically reduce cost of the apparati by reducing need for stabilization. Secondly, the channel bandshapes can have slightly irregular shapes. This reduces the cost of the spectrometer.

BRIEF DESCRIPTION OF THE DRAWINGS

FIG. 2A shows a double interferometer velocimeter using wideband illumination.

FIG. 2B shows the use of correlation and wideband illumination to find the range of a target.

FIG. 3A shows the comb-filter transmission spectrum of a phase-linear interferometer.

FIG. 3B shows a detail of the interferometer transmission spectrum having sinusoidal peaks of period $1/\tau$.

FIGS. 3C through 3E show that the effect of slightly changing the interferometer delay is to locally shift the spectrum by an amount proportional to frequency.

FIG. 4A shows a channel interferometer transmission spectrum.

FIG. 4B shows the effective transmission spectrum of a multiheterodyning interferometer formed from many similar channels contiguously filling the input bandwidth.

DETAILED DESCRIPTION OF THE INVENTION

Figure 1:
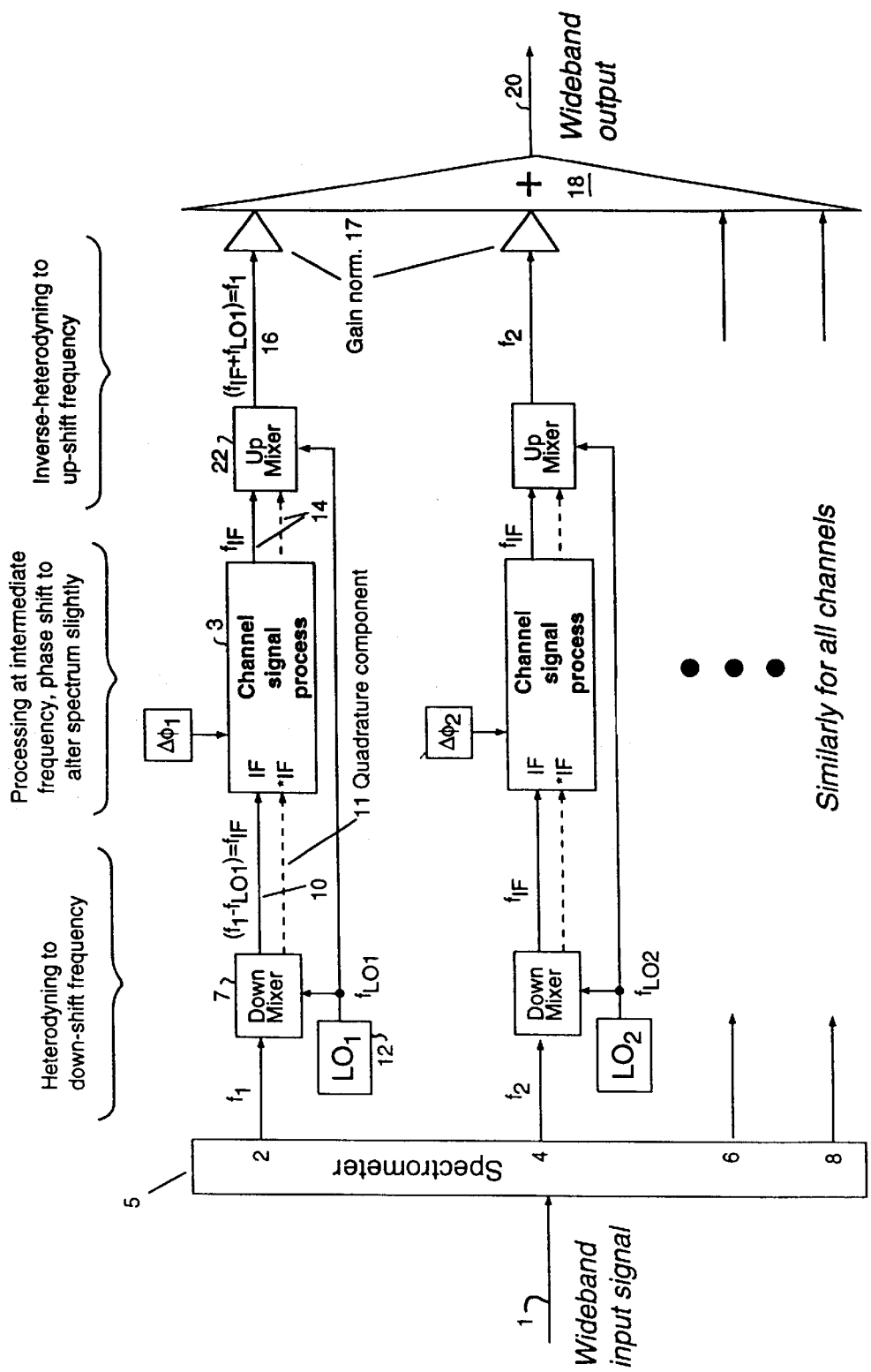
FIG. 1 is a schematic of multiheterodyning signal processor.

FIG. 1 shows an embodiment of the invention appropriate for signal processes that create a wideband output from a wideband input, such as delay, interferometry, and filtering with an arbitrary impulse response. Portions of FIG. 1 are also appropriate for other signal processes. For the processes of correlation and autocorrelation, the up-mixing step is omitted and an integral signal summed over all channels forms a net integral output. For the process of recording, the real-time up-mixing step is also omitted. Instead, it is performed essentially mathematically at a later time. For waveform synthesis, the input spectrometer 5 and down-mixing steps are omitted.

The multiheterodyning process can be described by following a signal through FIG. 1. The wideband input signal 1 having bandwidth $\beta_{net}$ is subdivided by the spectrometer 5 into many separate signals 2, 4, 6, 8 and so on, called band signals. These have smaller bandwidth of about $\beta_{ch}$ and different average frequencies. Each band signal is processed by a channel in a overall parallel manner. Only two of many possible channels are drawn, with the other channels being analogous. Let $f_x$ represent the frequencies of a generic band signal, and $f_1$, $f_2$ etc. those of specific channels. The term "bandshape" refers to the power transmission versus frequency curve of signals sent into a particular channel by the spectrometer. It is given by the output signal power spectrum divided by the input signal spectrum so that the transfer function of all the components along the signal path are included, including those of the input spectrometer, down-mixer, amplifiers in the channel signal processor, and up-mixer and output spectrometer, if used. Thus $\beta_{ch}$ is not necessarily set by the spectrometer, but could be set by other components further along the channel, whatever is more limiting.

Spectrometer

The spectrometer 5 could comprise a diffraction grating or prism, which disperses the signal versus frequency into different physical output paths, or a parallel arrangement of bandpass filters. It is optimal for the tightest correlations and for the most accurate preservation of the input signal character that the channel bandshapes fill the input bandwidth contiguously (shoulder-to-shoulder), so that there are $N_{ch}$ channels, $N_{ch}=\beta_{net}/\beta_{ch}$. However, sparsely arranged channel bandshapes can be tolerated in many applications, such as correlations. The correlation so obtained is less precise than one obtained with contiguous bands, but it may still be sufficiently precise to be useful, and is cheaper to achieve. Sparsely filled bandshapes will be the usual case for optical input signals, since the optical bandwidth ($10^{14}$ Hz) is 5 orders of magnitude larger than typical electronics bandwidth ($10^9$ Hz), and $N_{ch}$ will usually be quite less than 100,000.

The path of a signal through a generic channel will be described, while sometimes referring to items in the Figures specific to the first channel, for concreteness. The band signal 2 from the spectrometer is heterodyned to a lower frequency by the down-mixer 7 to form an intermediate frequency (IF) signal 10, and a quadrature version 11, called *IF. The heterodyning is done by mixing the band signal 2 with a frequency $f_{LO1}$, which is optimally located at the edge of the band. (Our analysis assumes $f_{LO}<f_x$. If $f_{LO}>f_x$, the polarities of the required channel phase shifts to achieve a given effect will be flipped.) Thus the IF signal could have frequency components ranging from 0 to $\beta_{ch}$. Let $f_{IF}$ represent the frequency of a generic component of IF. Let $f_{LO}$ represent the generic reference frequency and $f_{LO1}$, $f_{LO2}$ etc. represent one specific to a particular channel.

In FIG. 1, $f_{LO1}$ is shown generated by an oscillator 12 (typically called a "local oscillator"). However, instead of having separate signals $f_{LO1}$, $f_{LO2}$ etc., the reference frequencies could be components of a single reference signal, such as provided by a mode-locked oscillator having many harmonics. In this case the reference signal could be added to the input signal prior to the spectrometer, as shown in the optical embodiments of FIG. 5 and FIG. 6, rather than after the spectrometer. Since $f_{LO}$ and $f_x$ are close together in frequency, the spectrometer could route both of these to the same channel where heterodyning is subsequently performed.

Down-mixer

Figure 7A:
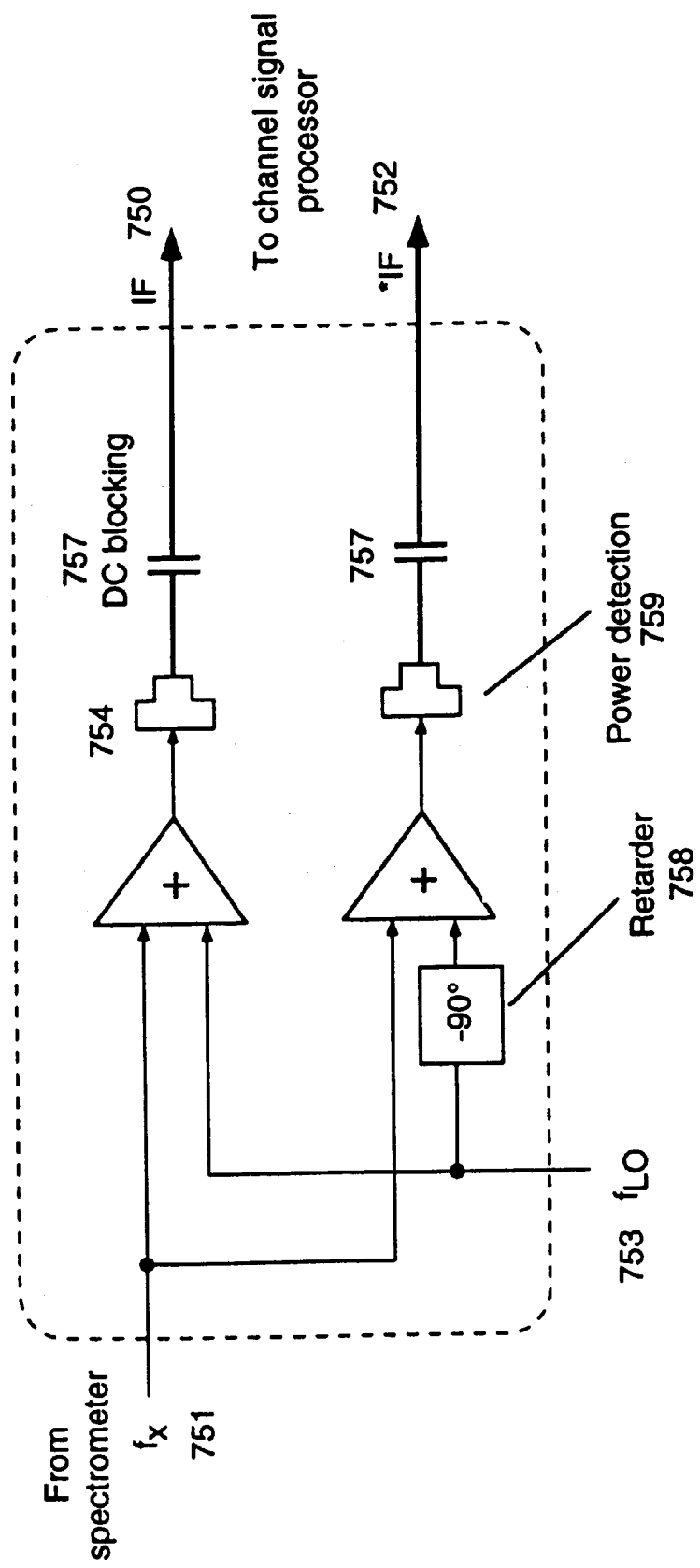
FIG. 7A shows a down-mixer creating a down-heterodyned signal using intensity detection and using a DC-blocking capacitor.

Heterodyning is well established in the art. Down-heterodyning can occur if two signals both illuminate an intensity (power) detector or are presented together to a non-linear device (FIG. 7A). Suppose the input signal (band signal) 751 is represented by $E_x e^{i\omega x^t}$ and the reference signal component 753 by $E_{LO}e^{i\omega LO^t}$, then the power (P) at a detector 754 is $|Exe^{i\omega x^t}+E_{LO}e^{i\omega LO^t}|^2$, which becomes $$P_{IF}=|E_x|^2+|E_{LO}|^2+2Re\{E_x E^*_{LO}e^{i(\omega_x-\omega_{LO})t}\}, \quad (Eq\ 1)$$

$$P_{IF}=\text{constant}+\sim\cos(\omega_x-\omega_{LO})t.$$

The last term of Eq. 1 is the difference frequency term which forms the IF output 750 and has cosine-like character. The first two terms of Eq. 1 are DC (zero frequency) terms and they need to be excluded from the IF output, otherwise they will masquerade as a legitimate DC term produced from band signal components having frequencies near $f_{LO}$. In FIG. 7A, the DC terms are blocked by capacitors 757 from the mixer outputs.

In FIG. 7A a quadrature output 752 is formed by heterodyning the input signal 751 against the reference signal 753 retarded at 758 by $-90°$ (advanced by $90°$). Then the power at detector 759 is $|Exe^{i\omega x^t}+E_{LO}e^{i90°}e^{i\omega LO^t}|^2$, which becomes $$P^*_{IF}=|E_x|^2+|E_{LO}|^2+2Re\{E_x E^*_{LO}e^{-i90°}e^{i(\omega_x-\omega_{LO})t}\}, \quad (Eq.\ 1B)$$

$$P^*_{IF}=\text{constant}+\sim\sin(\omega_x-\omega_{LO})t.$$

The last term of Eq. 1B is the difference frequency term which forms the *IF output 752 and has sine-like behavior. These two mixer outputs 750, 752 (IF, *IF) form a so-called "vector" intermediate frequency signal which is sent to the channel signal processor (3 in FIG. 1).

In general, the quadrature output (*IF) is produced by heterodyning against a reference signal phase shifted by $90°$ relative to the input signal. The relative phase shift can be $+90°$ or $-90°$ depending on whether *IF is intended to lead or lag IF. A lagging *IF is produced by retarding the input signal, or advancing (retarding by a negative amount) the reference signal, or a combination of both so that the difference in retardations is $90°$. A leading *IF is produced by the opposite arrangement. (In this specification, the term "retardation" generically can have either polarity, and whether a positive or negative retardation is called for needs to be taken from the context.)

The choice of whether to retard the input signal or reference signal depends on practical details. For example, for a weak input signal it may be undesirable to insert a retarding element into the input signal path because it may attenuate the signal, whereas the reference signal is usually strong.

Secondly, it is arbitrary whether to have *IF lead or lag IF, provided the operator is aware that this choice will flip the polarity of vector rotation $\Delta\theta$ required to apply to the channel signal process to produce the desired frequency shift. The retardation in FIG. 7A is chosen so that *IF lags IF, so that the *IF signal is analogous to the imaginary part and not the negative imaginary part of a complex number, and IF represents the real part.

Because it is easy to make a polarity mistake in the mathematics that describes vector rotations and channel phase shifts, the reader should use the following operational guideline: the correct polarity of phase shift and IF rotation to increase the effective delay of the net signal process is that which causes the spectrum of the channel signal process, as mapped to the input spectrum by the heterodyning, to appear to shift to lower frequencies.

It is acceptable that *IF lags or leads IF by an angle different than $90°$, provided it is not a small angle, say not less than $45°$. For this non-orthogonal case, the sinusoidal coefficients used for the vector rotations are different than that stated by Eq. 8 and Eq. 9. The correct rotational transformation can be found through straightforward vector mathematics by re-expressing the non-orthogonal direction vectors in terms of orthogonal direction vectors.

Figure 7B:
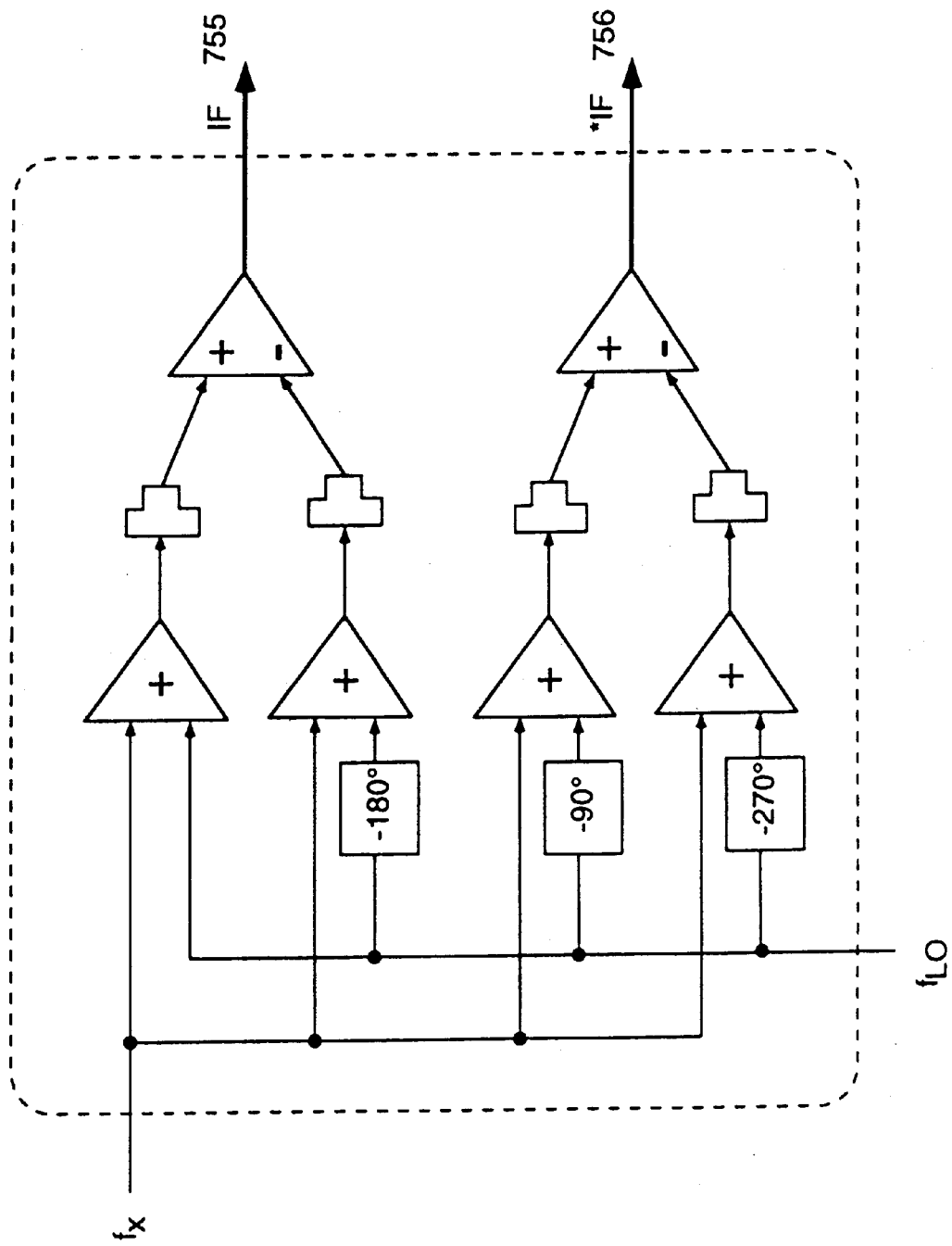
FIG. 7B shows a down-mixer creating a down-heterodyned signal using intensity detection and using push-pull subtraction to eliminate the DC component.

A drawback of the down-mixer circuit in FIG. 7A is that the DC blocking capacitors 757 also block the legitimate DC components. FIG. 7B shows a preferred down-mixer embodiment using a "push-pull" scheme that preserves legitimate DC components while eliminating the illegitimate DC components. By retarding the reference frequency by two amounts 180° apart, such as −90° and −270°, or 0° and −180°, and by subtracting the associated intensities, the differences 755 and 756 contain only legitimate DC terms. The push-pull schematic is analogous to the algebraic expression $(A+B)^2 - (A-B)^2 = 4AB$.

Down-heterodyning can also be achieved by replacing the power detectors in FIG. 7A and FIG. 7B by a non-linear device such as a diode that has a quadratic term in its output versus input behavior.

The heterodyning process can confuse $(f_x - f_{LO})$ signals with $(f_{LO} - f_x)$ signals. This confusion is called "aliasing" and is usually unwanted. To avoid aliasing, $f_{LO}$ can be chosen to be on the edge of the band rather than in the middle of it. Our analysis assumes $f_{LO}$ is on the lower edge of the band.

Vector signals

The expression of the down-heterodyned signals as a pair of signals (IF, *IF), one of which is in quadrature, could be called a vector signal, as opposed to a single IF signal which could be called scalar.

The vector signals are symbolized in the Figures by a pair of lines, one of which is dashed, such as the pair 10, 11 in FIG. 1. The vector expression is useful for expressing phase information for near-DC components of IF. For example, it is not possible to communicate the both the phase and amplitude of a DC component of IF by only one signal path. Secondly, even if DC components are not used, the vector expression of the IF signal allows simple methods for phase shifting all IF frequency components by the same amount, independent of intermediate frequency. This is desired to translate uniformly the spectral behavior contributed by each channel relative to the overall spectral behavior. This is useful for simulating a dilating net spectrum and hence a dilating temporal response for the net device.

This later discussion of phase shifting will center around FIG. 8A, and a IF phase shifting process that is independent of IF frequency has the effect of translating the bold line segments 601 called "channel segments" vertically without changing their slope. In point of fact, small changes in the slope can be tolerated, and depending on their polarity they can even help reduce dephasing due to "walkoff error". We can call the phase shift non-uniformity over the channel bandwidth an error $\Delta\phi_{slop}$, and generally we desire it to be less than 0.25 cycle in order to avoid dephasing effects.

To achieve a phase-linear process, it is optimal that the channel segments match the best fit global line as much as possible, such as within 0.25 cycle. In some applications phase-linearity is not required. For example, to compare two signals being sent through two multi-heterodyning apparatuses, it is the difference in phase error between channels "A" and "B" being compared and not the absolute phase error which is relevant.

Channel signal processors

For each channel, the vector signal (10, 11 in FIG. 1) from the down-mixer is applied to a channel signal processor, such as 3. For processes which will produce a high frequency output signal for the net device, such as interferometry, filtering, time delay or waveform synthesis, the channel signal processor outputs a vector signal 14 which is sent to the up-mixer 22 to be raised in frequency to form a channel high frequency signal 16. These are then summed over all channels by 18 to form the net wideband output 20. For processes such as correlation and autocorrelation, the signal processor output is a slowly varying scalar (also called a time-averaged or integral signal). These are summed over all channels omitting the up-heterodyning step to form the net correlation or net autocorrelation. For the process of recording, the (IF, *IF) vector channel input is stored for subsequent analysis at less than real-time and the real-time up-heterodyning step is omitted. (More precisely, the up-heterodyning step is performed essentially mathematically during the Fourier reconstruction of the input signal.)

Each channel signal processor has a phase shift parameter ($\Delta\phi$) input chosen by the user. This causes the spectral behavior for that channel to shift by $\Delta f = -\Delta\tau_{ch}$, where ch is the delay characterizing the channel signal process. Let $\Delta\phi_n$ be the $\Delta\phi$ for the nth channel. The choice of the set $\Delta\phi_n$ allows the temporal behavior of the overall multiheterodyning device to be adjusted precisely.

This phase shifting can be implemented by inserting a retarder into the IF path that delays the IF signal by a phase shift $\Delta\theta \Delta\phi$ which is ideally independent of $f_{IF}$. The allowed range of $f_{IF}$ may be restricted to those frequencies (such as by excluding DC components) where the error in $\Delta\theta$ is tolerable, such as less than 0.25 cycle. Alternatively, the phase shifting may be implemented by expressing the intermediate frequency signal as a (IF, *IF) vector and rotating that vector through sinusoidal linear combination by a rotation angle $\Delta\theta$, where $\Delta\theta \Delta\phi$. This has the advantage of working for all frequencies, including DC components. Portions of the channel signal processor responsible for rotations include "vector rotators" and "rotating delays". Another method called "post-average weighting" uses unrotated IF, *IF signals as inputs and applies the sinusoidal weighting to signals formed at the end of a process, such as after instead of before the time-averaging that occurs in a channel correlation process. Another phase shifting method is to adjustably retard the reference or input signal arriving at the down-mixer.

In single delay processes $\Delta\theta = \Delta\phi$. In multiple delay (multiple echo) processes $\Delta\theta = \Delta\phi(\tau_m/\tau_{ch})$, where $\tau_m$ is the delay associated with the $m^{th}$ echo. If the *IF leads instead of lags IF, then the polarities of $\Delta\theta$ are flipped from those stated above. If $f_{LO} > f_x$ instead of $f_{LO} < f_x$, then the polarities are flipped again.

In cases where channel outputs are summed over channels, the channel outputs are adjusted in gain prior to summing, to normalize them. This is indicated in the Figures by amplifiers such as 17 in FIG. 1. The normalization takes into account the loss of signal through the entire signal path from spectrometer, down-mixer, channel signal processor, and up-mixer and final combiner, if applicable. Suppose the signal process was a perfectly neutral process where the (IF, *IF) vector channel input directly formed the vector channel output. Then optimally the gains of the channels would be adjusted so that the output of the multiheterodyning device would be a coherent replica of the input, as much as possible.

Up-mixing

Figure 9A:
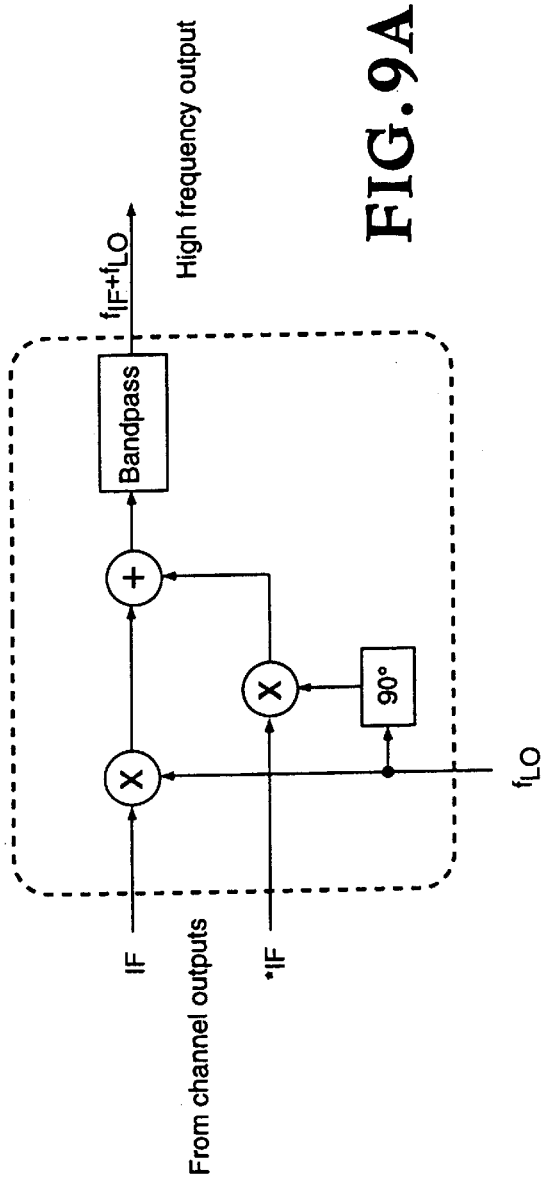
FIG. 9A shows an up-mixer creating an up-heterodyned output using amplitude modulation.

FIG. 9A shows an up-mixer, which is responsible for shifting the frequency of the channel output signal upward from $f_{IF}$ to, or near to, its original value prior to down-heterodyning. It does this by heterodyning against $f_{LO}$ (or other reference frequency) and bandpass filtering to allow the sum frequency component $f_{IF}+f_{LO}$ to pass. (If $f_{LO}>f_x$, then the difference frequency $f_{IF}-f_{LO}$ is used.)

The quadrature intermediate frequency signal is up-heterodyned against the reference signal retarded or advanced by 90°, depending on whether *IF lags or leads IF. This way the original phase of the input signal can be restored in the net output.

Usually it is desired to up-heterodyne with the same reference frequency as was used in the down-heterodyning process, so that spectral components of the input signal are restored to their original values in the net output signal, and phase coherence is easy to maintain. Also, this obviates the problem of stabilizing the frequency of a second reference frequency relative to the first. Practically, it is simplest to use the same reference frequency for up and down mixing. If it is desired to create a wholesale shift of frequencies between net input and net output, such as to compensate for Doppler effects in moving targets, then this is more practically done by dynamically changing channel phases $\Delta\phi$ at a desired beat frequency.

If it is important to have a phase coherent wide bandwidth output, then the difference in phase of the reference signal at the up-mixer compared to at the down-mixer should optimally be zero or uniform across all channels. For some applications, such as imprinting a comb-filter power spectrum on a noise source, channel to channel phase coherence is not needed.

Figure 9B:
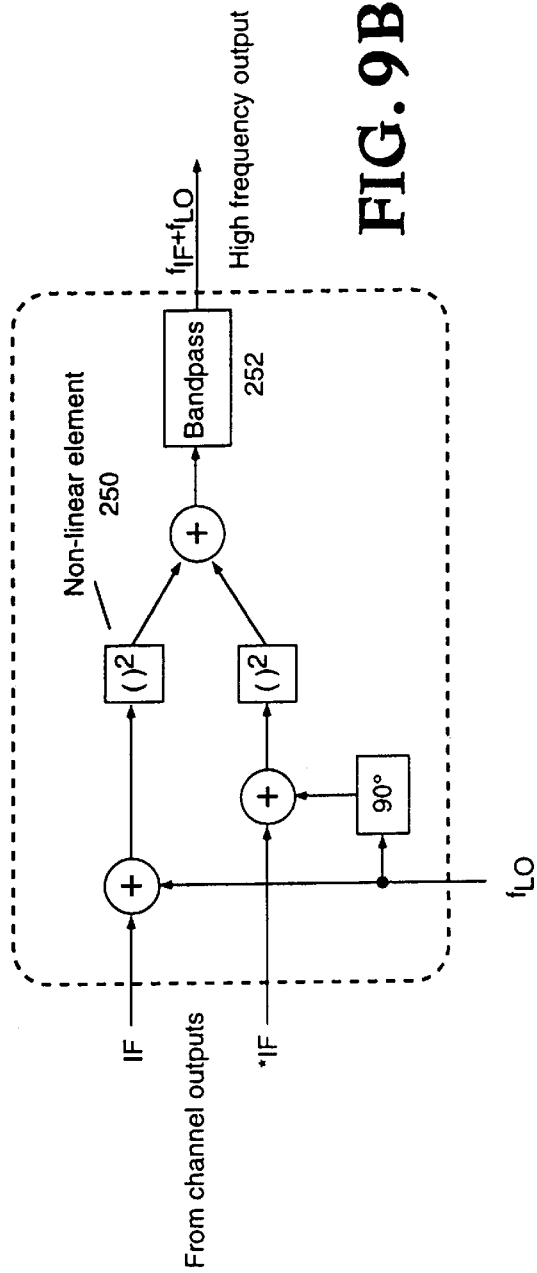
FIG. 9B shows an up-mixer creating an up-heterodyned output using passage of signal and reference through a non-linear device.

Heterodyning is fundamentally a multiplication of the LO signal by the IF signal, and could be accomplished by using IF to modulate the gain of an amplifier passing LO. Alternatively, the multiplication can be created in effect by passing the sum signal (IF+LO) through a non-linear device 250 which has a quadratic term in its behavior, as shown in FIG. 9B.

The bandpass filter 252 blocks the carrier ($f_{LO}$) and difference frequency signals ($f_{LO}-f_{IF}$). The difference frequency signals are an aliased signal having a spectral shape which is reversed compared to the un-aliased signal ($f_{IF}+f_{LO}$.) That is, its spectrum is reflected about an axis at $f_{LO}$. The aliased signal is usually undesired because any frequency shifts created by the channel phase shifting will shift the aliased signals in the opposite direction. These may form a "ghost" signal which has a different spectral character than intended.

In some cases of a pair of multiheterodyning units "A" & "B", the aliased up-heterodyned signal components can be allowed to remain in the net output signal of unit "A", thereby reducing the cost of the apparatus by omitting a filtering step. These cases include when the detecting unit "B" has more sparsely arranged bandshapes that do not sense the aliased versions of the signals outputted by illuminating "A" unit.

Summation over channels

The last step is to sum the contributions from all the channels to form the net output. Either the high frequency channel signals from the up-mixer are summed to form a net wideband output, or in the case of correlations, the channel correlation outputs are summed to form a net correlation.

Figure 10:
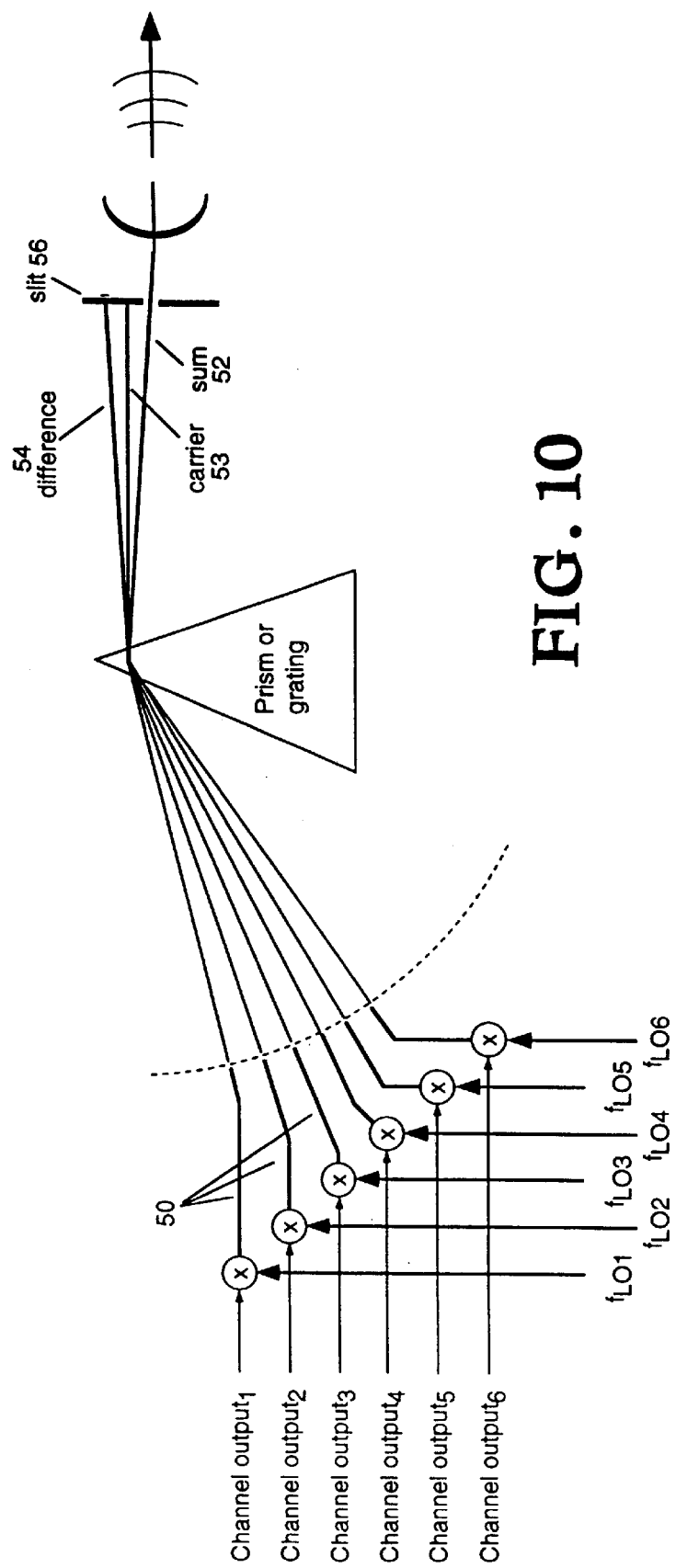
FIG. 10 shows an up-mixer constructed from a spectrometer which combines heterodyned signals from many channels and passes only the sum frequency components.

FIG. 10 shows how a spectrometer can be used in a reverse orientation from the conventional usage to combine many high frequency channel outputs 50 into one summed output beam 52 having the sum frequency ($f_{IL}+f_{LO}$) while simultaneously excluding the carrier 53 and difference frequencies 54. A slit 56 excludes the unwanted frequencies. If the spectrometer uses a prism made of a normally dispersive material, then the sum frequencies will be refracted by a greater angle than the other components, and so the slit should be on the side as shown in FIG. 10. If instead a diffraction grating is used, high frequencies are diffracted less and the slit should be on the opposite side of the carrier beam 53 as shown in FIG. 10.

Phase linearity

To discuss the need for channel phase shifting we must introduce the concepts of phase-linearity, and temporal/spectral dilation. These concepts are most easy to visualize for an interferometer. However, they apply to the other signal processes as well.

FIG. 3A shows the ideal power transmission spectrum of an interferometer $T=(\frac{1}{2})\{1+\cos[\omega\tau+\text{const}]\}$ where "const" is a constant. The value inside the brackets is the phase $\phi$, so that $T=(\frac{1}{2})\{1+\cos[\phi]\}$, and $\phi=\omega\tau+\text{const}$, where phase is in units of radians. Note, $\omega=2\pi f$, so when phase is in units of cycles we have $$\phi=f\tau+\text{const}/2\pi. \qquad \text{(Eq. 1C)}$$

The factors of $2\pi$ are often omitted from the language for brevity, and the symbols $\omega$ and f used interchangeably. The appropriate units for phase is either radians or cycles, depending on the symbol used.

The ideal interferometer is said to be "phase-linear" because $\phi$ is a linear function of frequency. If instead $\phi=\omega\tau+\text{const}(\omega)$, where const is a non-linear function of $\omega$, then the interferometer (or other process) is said to be phase-nonlinear. This concept applies to any process that can be mathematically expressed in Fourier terms $e^{i\omega t}$.

A multiheterodyning process is not phase-linear for random values of $f_{LO}$. However, it can be made phase-linear by setting the channel phases $\Delta\phi$ to a set of values $\Delta\phi_{lin}$ approximately given by $$\Delta\phi_{lin}=f_{LO}<\tau_{ch}>, \text{(In cycles)} \qquad \text{(Eq. 2)}$$

where $<\tau_{ch}>$ is the average of $\tau_{ch}$ over all channels, and $\tau_{ch}$ is the delay characterizing each channel. (The subscript "ch" helps distinguish this value from the delay characterizing the net device.) These $\Delta\phi_{lin}$ phase shifts raise the channel segments 601 of FIG. 8A so they fall along a global line 600 having slope $<\tau_{ch}>$.

It is implied that only the fractional part of a phase shift expressed in units of cycles need be used, since phase is periodic. That is, if $\Delta\phi=234.563$ cycles, we could use $\Delta\phi=0.563$ cycles=202.68°.

Temporal and spectral dilation

Figure 8A:
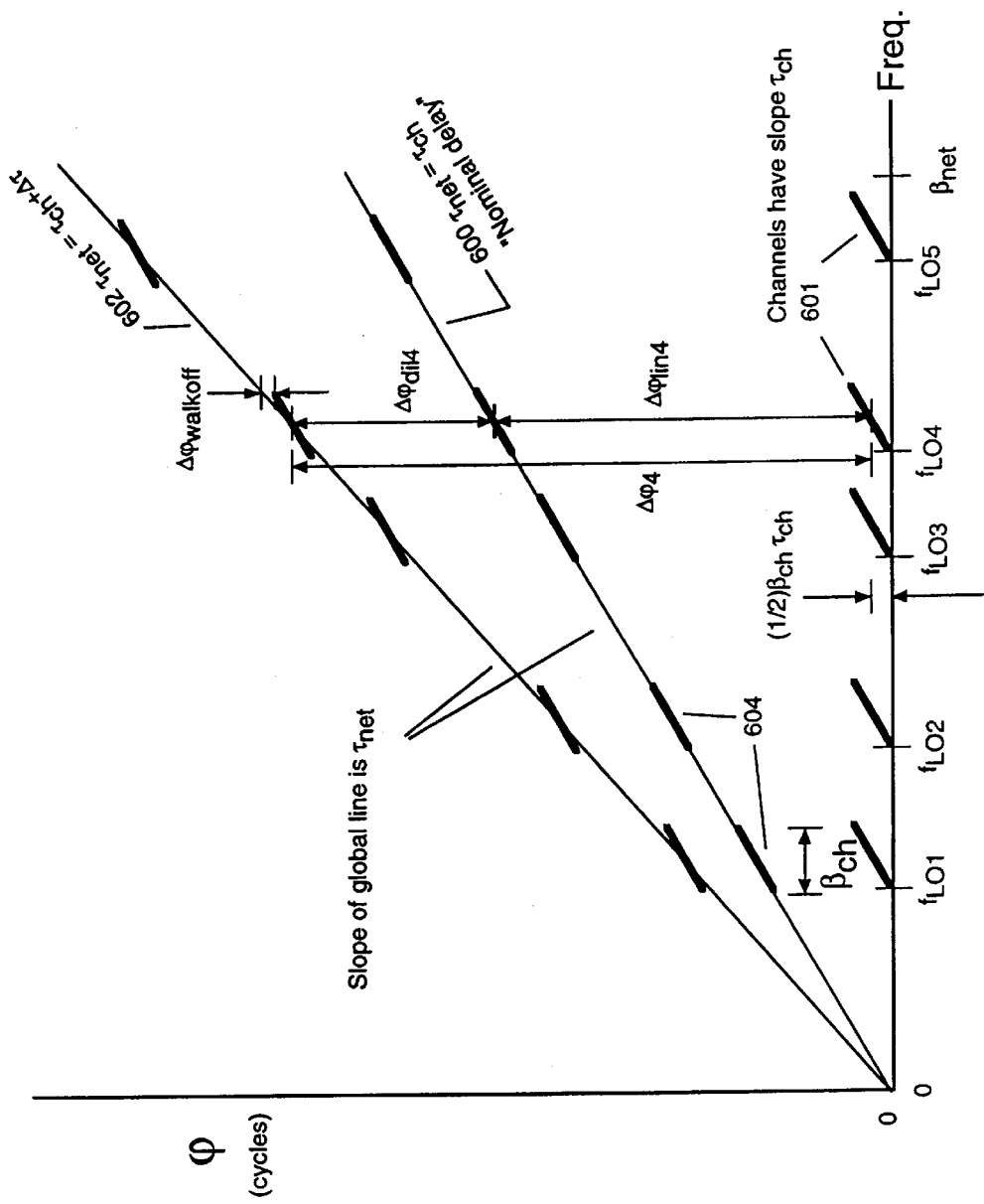
FIG. 8A shows a plot of phase versus frequency of a signal from a signal process having characteristic delay $\tau$.

When the phase $\phi$ is plotted versus frequency, as in FIG. 8A, the slope of a line is the delay $\tau$ characterizing the device or process. Slight changes in $\tau$ are called a "temporal dilation" and cause a concomitant spectral dilation of opposite polarity. Because of Eq. 1C, $f\sim\phi/\tau$, so increases in $\tau$ at constant $\phi$ cause a decrease in f, and increases in $\tau$ holding f constant increases $\phi$. Thus positive $\Delta\tau$ is associated with positive $\Delta\phi$ and negative $\Delta f$.

Lines extending from zero to $\beta_{net}$ in frequency are called "global lines". The global line slope can obviously be changed by directly altering $\tau$. Alternatively, and what is interesting about this invention, is that the average slope can also be changed by dividing it into segments which are moved as blocks, while preserving their original, local slopes, which are given by $\tau_{ch}$. This is what occurs in a multiheterodyning processor through channel phase adjustment, where each block represents the region of input frequencies handled by a channel. Moving the segments as blocks upward is equivalent to shifting the spectra within each channel lower (leftward) in frequency. (This can be remembered by noting that for lines sloping from bottom left to upper right in FIG. 8A, a line lying above another line also lies to the left.)

This is illustrated by FIG. 3B through FIG. 3E. These show closeups of different segments of the interferometer comb-filter spectrum of FIG. 3A when the interferometer delay is dilated from $\tau$[solid curve] to $(\tau+\Delta\tau)$ [dashed curve]. The spectrum contracts, which locally shifts segments to lower frequencies by different amounts $\Delta f = -f(\Delta\tau/\tau)$, proportional to segment average frequency. The frequency shift can also be expressed as a phase shift called $\Delta\phi_{dil}$. According to Eq. 1C, $$\Delta\phi_{dil,n} = f_{ave,n}\Delta\tau, \text{ (in units of cycles)} \qquad \text{(Eq. 4)}$$

where $f_{ave,n}$ is the bandshape's average frequency $f_{ave}$ for the $n^{th}$ channel.

Thus the net temporal behavior of the invention can be precisely altered by an amount $\Delta\tau = \Delta\phi_{dil}/f$ by phase adjustments coordinated over many segments (channels). When the device is phase-linear the global line can be considered a best fit line through the channel segments weighted by the detailed shape of the bands. Because this averages the slope over many channels, $\Delta\tau$ can be more precisely determined than for a single channel used alone.

Small delays are achieved by small phase shifts. For example, a 10° shift at a 30 GHz channel corresponds to 0.9 ps. Such small delays are needed to resolve shifts of the autocorrelation peak in a velocimeter for small velocities. For example, a 2.5 m/s target for a $\tau=2$ ms delay velocimeter produces a round-trip Doppler shift of $(2)(2.5 \text{ m/s})(2 \text{ ms})/(3\times10^8 \text{ m/s})=33$ ps.

Although it is easiest to visualize the channel phase shift induced dilation effect on a phase-linear device, the dilation effect also works on a nonphase-linear device. It also applies not only to interferometry, but all channel signal processes, because it is rooted in the expression of signals as Fourier components $e^{i\omega t}$, where $\omega$ refers to input frequencies and does not change significantly across a band (because $\beta_{ch} << \beta_{net}$).

Purpose of channel phase shifting

Thus, two purposes for slightly translating the spectrum of each channel are: 1) to simulate the dilation of the overall signal process spectrum so that the effective characteristic time $\tau$ of the net device is altered in a very precise manner; and 2) to make the net device phase-linear, if desired. The phase shift applied to each channel is a sum of two contributions $$\Delta\phi = \Delta\phi_{lin} + \Delta\phi_{dil} \qquad \text{(Eq. 5)}$$

where a term $\Delta\phi_{lin}$ brings the net device into phase-linearity, and a term $\Delta\phi_{dil}$ dilates the effective delay of the net device by $\Delta\tau$. Approximately, $$\Delta\phi_{dil} = f_{ave}\Delta\tau; \text{ and} \qquad \text{(Eq. 6)}$$

$$\Delta\phi_{lin} = f_{LO} <\tau_{ch}>. \qquad \text{(Eq. 7)}$$

The effective delay can be dilated regardless of whether the device is phase-linear or not. This is a key point that allows the use of reference frequencies that, on a detail level, have no special relationship to each other and can be arbitrary. (On a coarse level, it is optimal to evenly distribute $f_{LOn}$ across the input bandwidth $\beta_{net}$.)

It is interesting to point out that for many useful applications a phase-linear device is not required, and in this case $\Delta\phi_{lin}=0$. A phase-nonlinear device is acceptable for circumstances where two signals are being compared through multiheterodyning devices sharing the same reference frequencies $f_{LOn}$. On the other hand, a phase-linear device is desired whenever a signal is to be subsequently treated by an external apparatus which expects phase-linearity or cannot share the reference frequencies, e.g., to make a stand-alone delay line which is to output a coherent replica of the input signal.

Applications needing phase-linearity will also probably need channel bandshapes contiguously filling the input bandwidth. Contiguous filling is also optimal for producing the least ambiguous and narrowest correlation and autocorrelation peaks. However, sparsely filling the input bandwidth is more economical, and can be tolerated by multiheterodyning apparatuses sharing reference frequencies.

Rotation of the IF vector

The channel processor is designed to shift its spectrum by an amount $\Delta f = -\Delta\phi/\tau_{ch}$. That is, positive phase shifts produce negative frequency shifts. In general, a signal process may use delayed and undelayed components of the (IF, *IF) signal vector. A spectral shift can be created by using, for the delayed components, a rotated version of the (IF, *IF) vector rotated by an angle $\Delta\theta$. This is called (IF', *IF') and given by a rotational transformation $$IF' = IF \cos \Delta\theta + {}^*IF \sin \Delta\theta \qquad \text{(Eq. 8) and}$$

$${}^*IF' = -IF \sin \Delta\phi + {}^*IF \cos \Delta\phi. \qquad \text{(Eq. 9)}$$

Note, this method works even for the DC components of (IF, *IF).

If the (IF, *IF) vector is represented by $\sim e^{i\omega t}$, then the rotation specified by Eq. 8 & Eq. 9 is the same as multiplying that term by a phasor ($e^{-i\Delta\theta}$), a clockwise rotation in the complex plane, or a retardation. (To test this, set $\Delta\theta=90°$ and we see that IF becomes *IF, which agrees with our assumption that *IF lagged IF.)

Figure 11A:
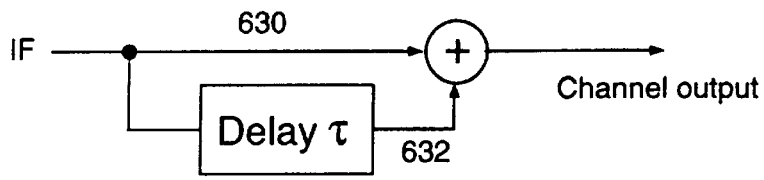
FIG. 11A shows an interferometer without phase shift.
Figure 11B:
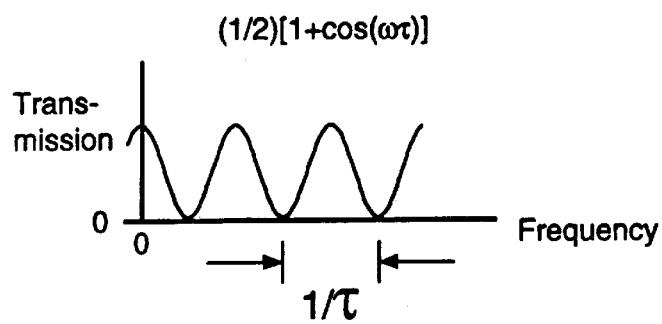
FIG. 11B shows the power transmission spectrum of the interferometer of FIG. 11A.
Figure 11C:
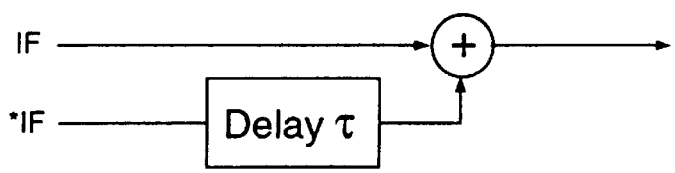
FIG. 11C shows a 90° phase-shifted interferometer using quadrature IF signal for the delayed branch.
Figure 11D:
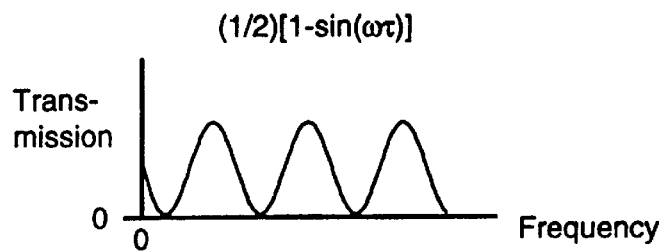
FIG. 11D shows the power transmission spectrum of the interferometer of FIG. 11C.
Figure 11:
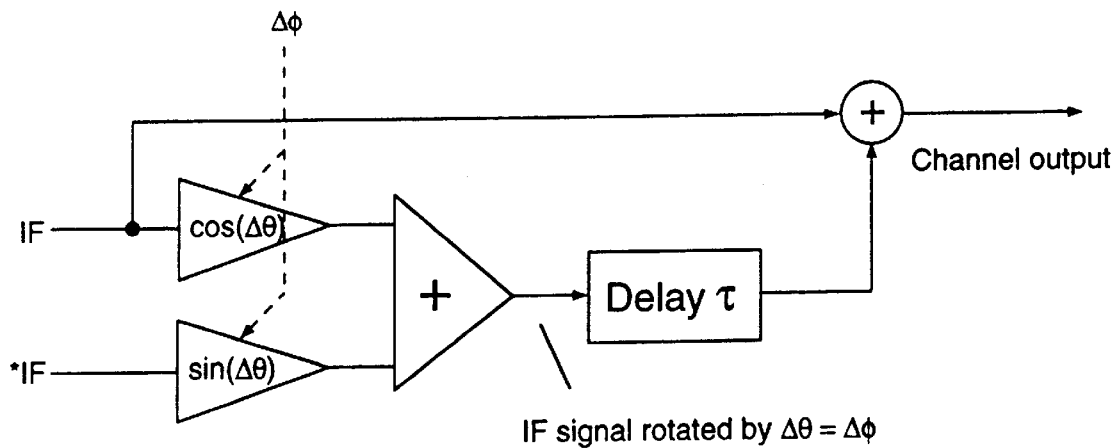
FIG. 11E shows an interferometer phase-shifted by an adjustable amount.
FIG. 11F shows the spectrum associated with the interferometer of FIG. 11E having an adjustable frequency shift.
Figure 11:
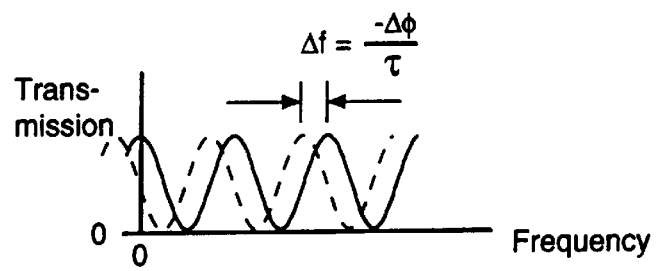

FIGS. 11A through 11F show how rotation of the IF vector works for the case of an interferometer. The simple interferometer shown in FIG. 11A uses IF for both the undelayed 630 and delayed 632 branches and has the power transmission spectrum shown in FIG. 11B, $T=(\frac{1}{2})[1+\cos(\omega\tau)]$. FIG. 11C shows an interferometer using for the delayed branch the lagging quadrature *IF signal instead of IF. The corresponding spectrum $T=(\frac{1}{2})(1-\sin \omega\tau)$ shown in FIG. 11D is shifted to lower frequencies by an amount equivalent to 90° in phase. Thus to translated the spectrum by an adjustable amount, the delayed branch should use an IF signal rotated by an adjustable amount.

This is accomplished by the circuit FIG. 11E, which implements the first equation of the rotational transformation Eq. 8. The corresponding spectrum is shown in FIG. 11F. The mathematical derivation of the spectrum is as follows. Let the undelayed branch be $E(t)=e^{i\omega t}$ and the delayed branch $E(t-\tau)=e^{-i\Delta\theta}e^{-i\omega\tau}e^{i\omega t}$, where the phasor $e^{-i\Delta\theta}$ represents the adjustable rotation. Then the power spectrum is $|E(t)+E(t-\tau)|^2$ and hence $T=(\frac{1}{2})[1+Re\{e^{i\Delta\theta}e^{i\omega\tau}\}]=(\frac{1}{2})\{1+\cos(\omega\tau+\Delta\theta)\}$, where "Re" means "real part of". Hence positive values of $\Delta\theta$ shift the spectrum (dashed) to the left (lowering frequencies). Thus we want $\Delta\theta = \Delta\phi$.

Channel interferometer with vector output

The channel interferometer of FIG. 11E produces a scalar output. This is sufficient for phase insensitive applications, which care only about the power spectrum, such as velocimetry. However, to be mathematically complete and for applications where the accurate propagation time of the undelayed portion of the signal through the interferometer matters, a vector output should be provided, so that the correct complex description of the input signal can be propagated through the channel signal processor. For example, in a combination process where correlation follows interferometry, such as to determine range as well as determine velocity, a vector channel output is desired from the channel interferometer.

Figure 12A:
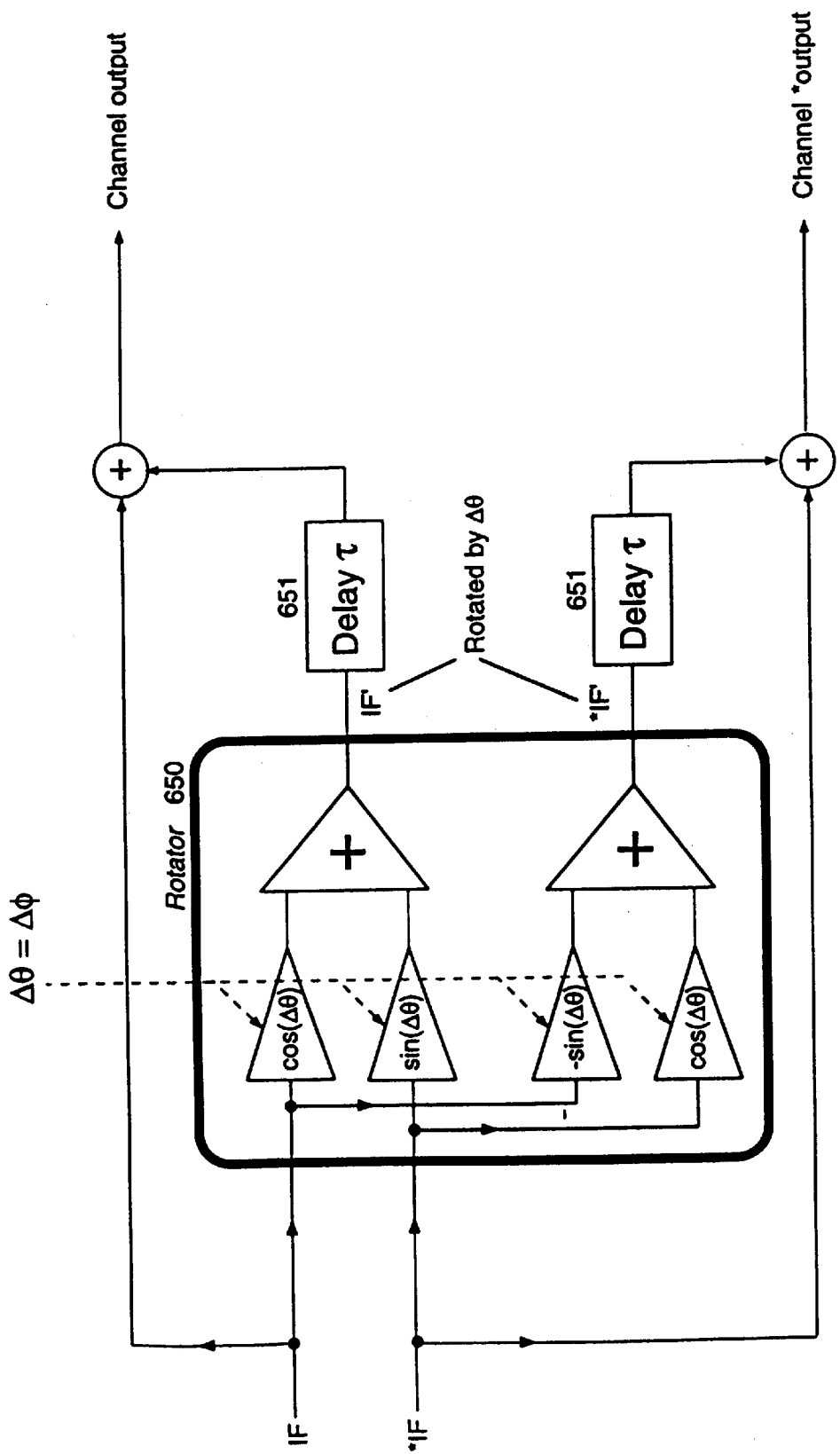
FIG. 12A shows a channel signal processor which is an interferometer having delay $\tau$, vector rotation $\Delta\theta$, and forming a vector output.

FIG. 12A shows a channel interferometer producing a vector output. This could be called a "vector interferometer". The circuit inside the bold oval 650 could be called a "Rotator" and is responsible for rotating the IF vector signal by $\Delta\theta$, to produce a rotated vector (IF', *IF'). Nominally we would use $\Delta\theta=\Delta\phi$. The value of $\tau$ used in the delays 651 is the parameter $\tau_{ch}$ used in the phase shift analysis.

An interferometer is a special case of an arbitrary filter where there is either a constant spacing between echoes or a small number of distinct spacings. A spacing value is called the interferometer delay $\tau$, and it is the most important parameter controlling the interferometer behavior. For purposes of forming autocorrelations, it is optimal to have as few distinct $\tau$ values as possible, ideally a single value. Otherwise there could be a dilution and confusion of autocorrelation peaks, since there will be a peak associated with each distinct $\tau$ value. Multiple $\tau$ values can be tolerated if they are significantly different than each other (separated by more than several times the coherence time, $1/\beta_{net}$).

The most common type of interferometer is a two-path interferometer analogous to the Michelson interferometer, where one echo of equal amplitude to the undelayed signal is produced. This echo could have a positive or negative polarity amplitude compared to the undelayed signal, producing complementary outputs analogous to the two complementary arms of a Michelson interferometer. Another useful kind is a recirculating interferometer which generates an infinite number of equally spaced echoes having geometrically decreasing amplitudes.

An interferometer can be used to form an autocorrelator, when the time-averaged power passing through the interferometer is measured versus characteristic delay. For this purpose it is optimal that all the echoes be equally spaced. A two-path interferometer is the optimal interferometer to use because it can yield a single-peak autocorrelation. In contrast, multiple echo interferometers yield autocorrelations having multiple peaks. These are still useful in situations (such as where small velocity changes are being measured) where the central peak can be distinguished from the other peaks.

Figure 2C:
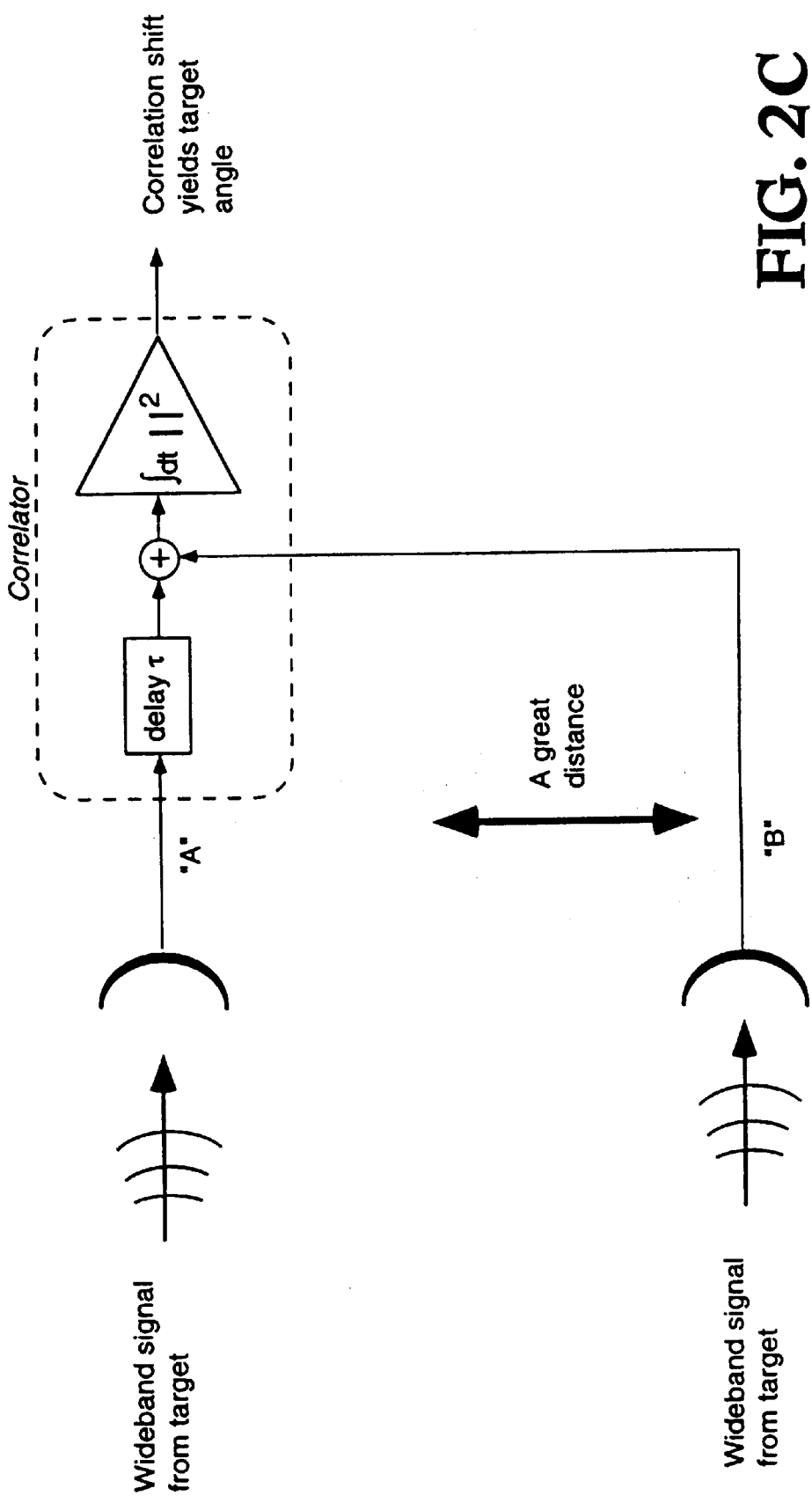
FIG. 2C shows the use of correlation to find angular position of a wideband emitting target.
Figure 4C:
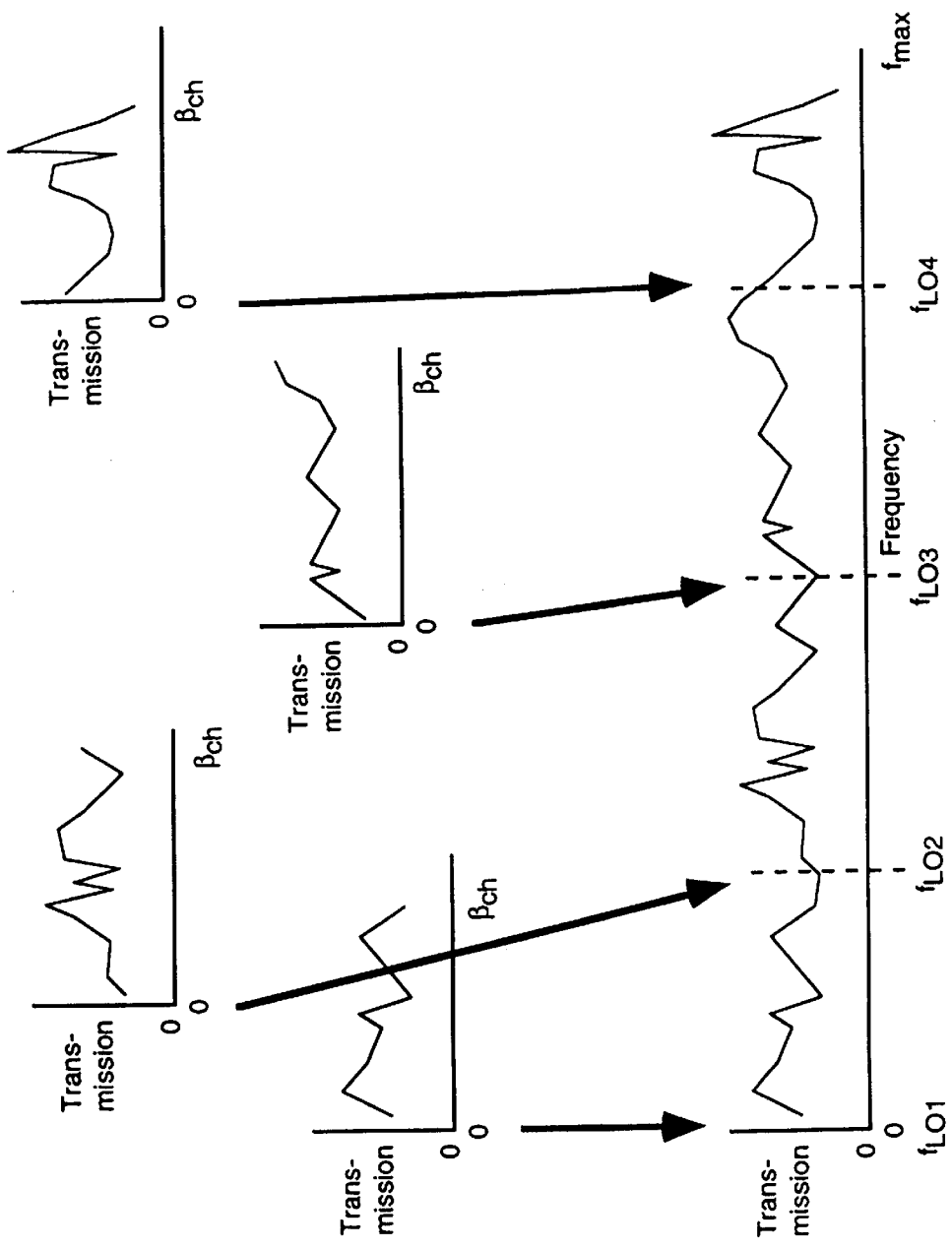
FIG. 4C shows a non-periodic wideband spectrum formed from many individualized channel spectra.

A pair of matched interferometers can be used for velocimetry using wideband illumination (FIG. 2A and FIG. 18). The "A" interferometer imprints a comb-filter spectrum on a wideband source 100, which is to say it imprints echoes having characteristic delay $\tau_A$. This imprinted beam 104 can illuminate a target. A second interferometer ("B") having nearly identical characteristics observes the waves 106 reflected from the target. The time-averaged power passing through the second interferometer is measured versus "B" interferometer delay to essentially form an autocorrelation. The peak location of this autocorrelation shifts with target velocity (and is proportional to $\tau_A$)

Strictly speaking, for this velocimetry purpose other kinds of matched filters could be substituted for the two interferometers. However, compared to a two-path interferometer these may produce weaker autocorrelations, or the behavior may be more complicated to analyze mathematically. The two-path and recirculating interferometers are the two most useful kinds of filters for wideband velocimetry.

Channel delay line

Figure 12B:
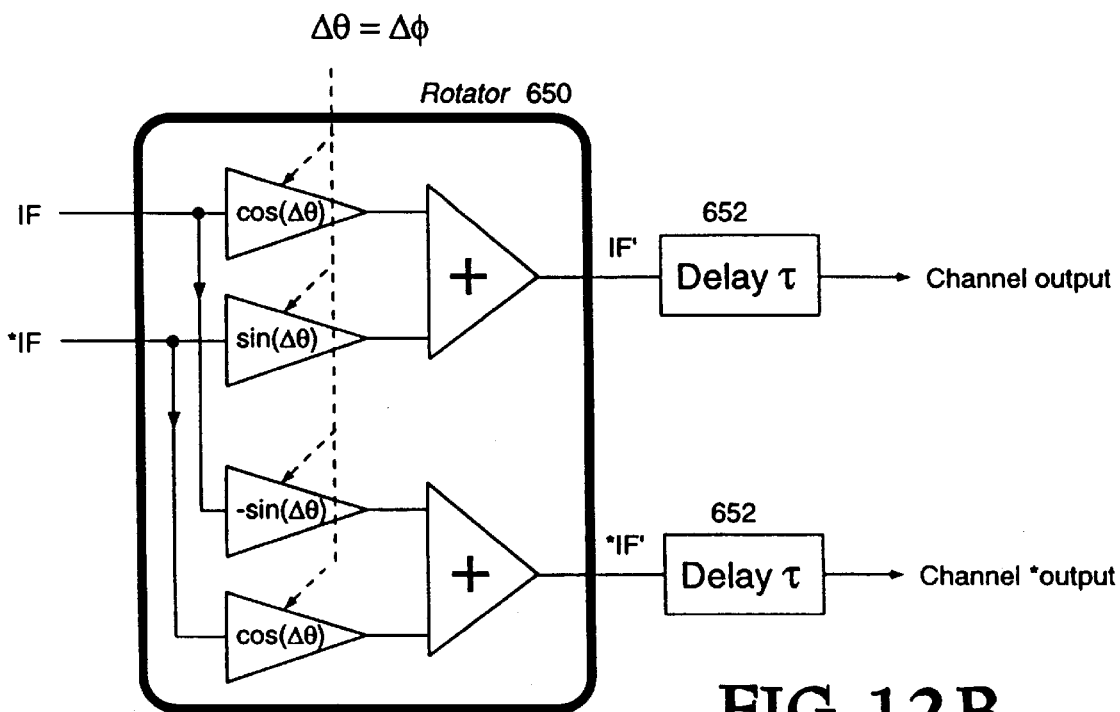
FIG. 12B shows a channel signal processor which is a delay of duration $\tau$ and vector rotation $\Delta\theta$.

A channel delay unit that produces a vector output and has the signal rotation property is shown in FIG. 12B. This could be called a "rotating delay" or a "vector delay". Delay units are fundamental building blocks for constructing filters. Nominally $\Delta\theta=\Delta\phi$.

A method of implementing the actual delaying of the IF or *IF signal, indicated by the boxes such as 652 used throughout the figures labeled "Delay $\tau$", include digital and analog methods. A digital delay line consisting of an analog-digital converter (A/D), shift register, and digital-analog converter (D/A) can easily create several millisecond delays. These would have a bandwidth roughly half the clock frequency used to drive the shift registers. Analog methods include conversion of IF signal to an acoustic wave which propagates a distance and then is detected, or use of the IF signal to modulate the intensity, color, phase or polarization state of an optical signal sent through a long fiber.

Channel recirculating interferometer

Figure 13A:
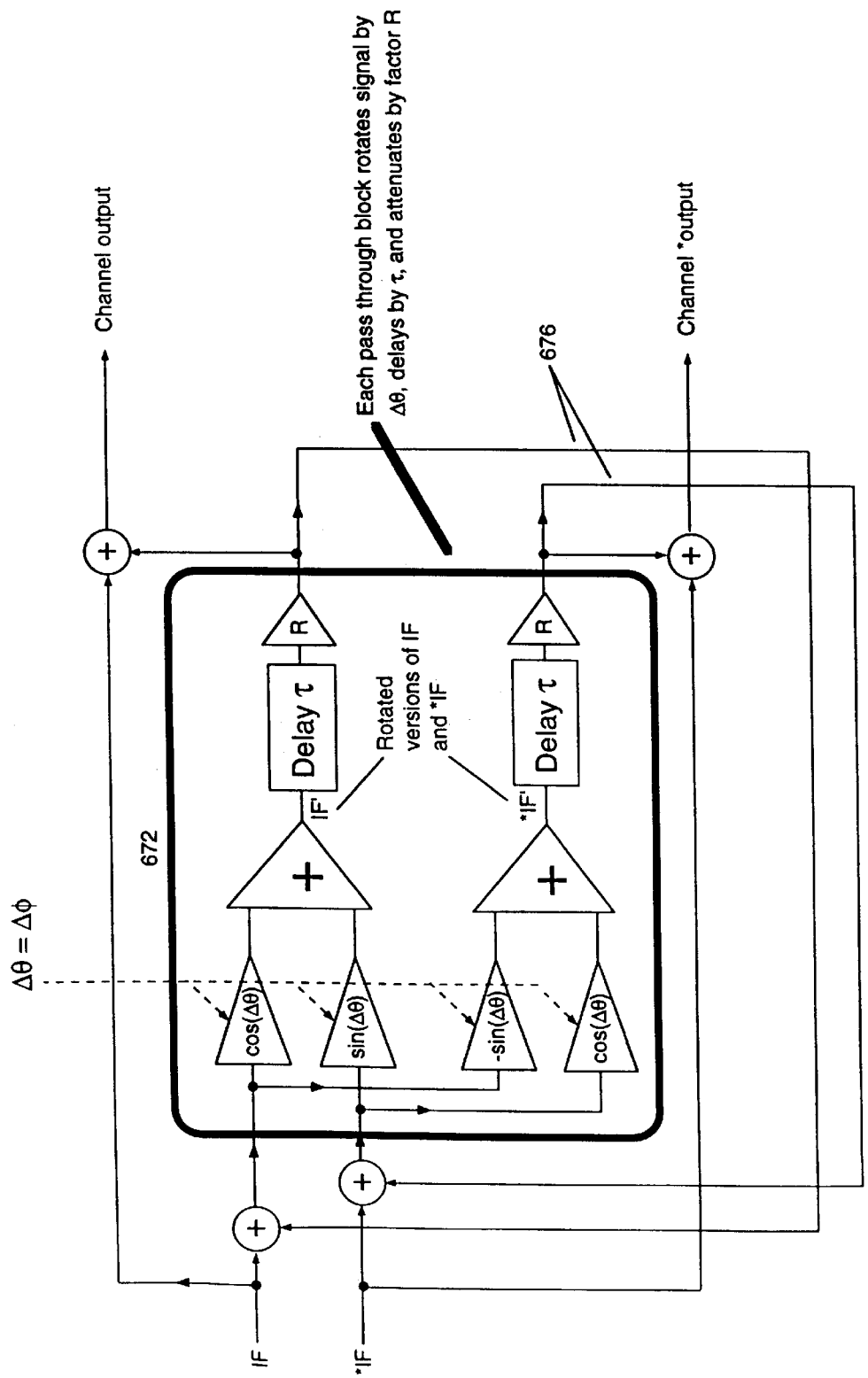
FIG. 13A shows a channel signal processor which is a recirculating interferometer having a set amount of signal rotation, delay and attenuation per circuit.
Figure 13B:
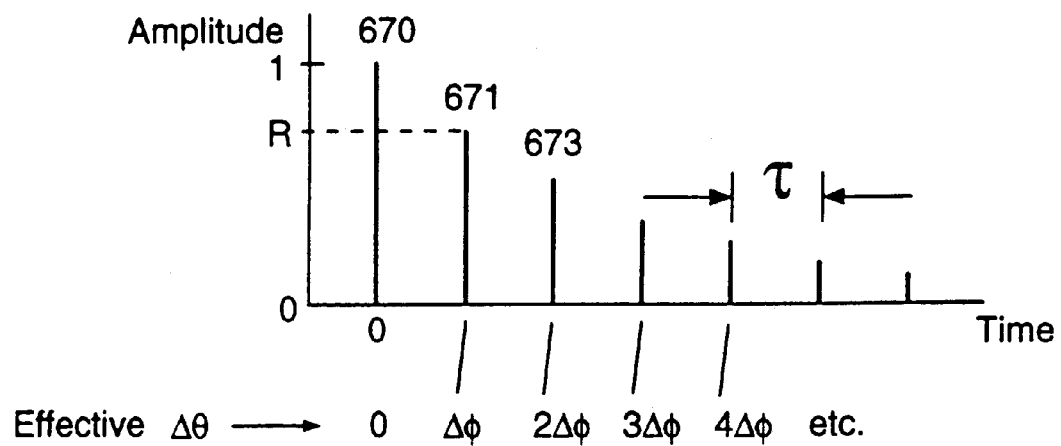
FIG. 13B shows the impulse response for a recirculating interferometer.
Figure 13C:
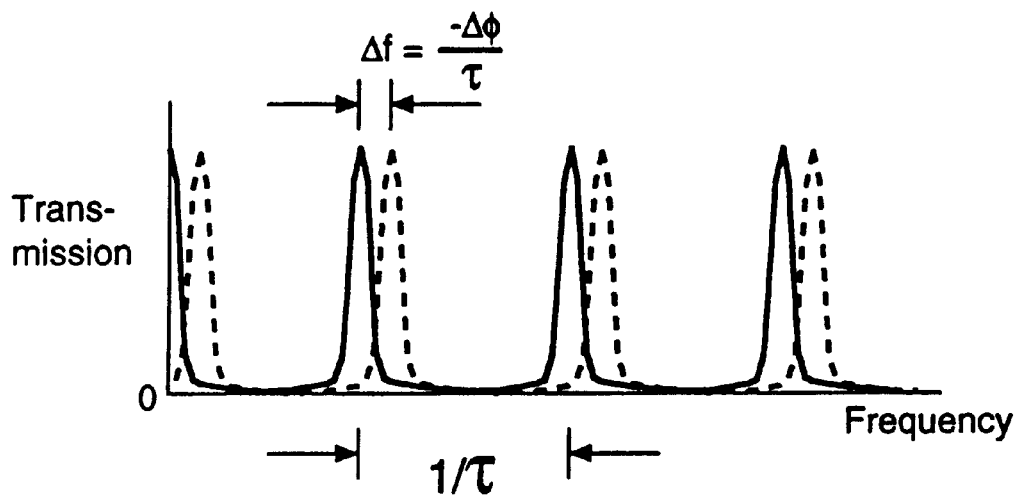
FIG. 13C shows the power transmission spectrum for the recirculating interferometer.

FIG. 13A shows a circuit which creates a recirculating interferometer, which is a kind of filter analogous to an optical Fabry-Perot interferometer. This has the impulse response shown in FIG. 13B, an infinite series of geometrically decreasing echoes 671, 673 etc. separated by interval $\tau$. The amplitude of each subsequent echo is R times the preceding echo. The Fourier power transform of the impulse response FIG. 13B is the transmission spectrum FIG. 13C. This has the same periodicity $1/\tau$ as the sinusoidal comb-filter but has narrower peaks. The closer R is to unity, the narrower the peaks are relative to the spacing between peaks. The circuit FIG. 13A recirculates the vector IF signal. For each round trip around the circuit and through the block 672, the vector signal 676 is delayed by $\tau$, rotated in phase by $\Delta\theta$, and its amplitude multiplied by factor R (which must be <1 to avoid oscillation). Nominally $\Delta\theta=\Delta\phi$.

Channel arbitrary filter

To create an arbitrary filter one defines its impulse response, since the impulse response and spectral response are Fourier transforms of each other. Let the first spike 300 of an impulse response (FIG. 14B) define unity amplitude. Subsequent spikes 301–304 are called echoes and have user-chosen amplitudes and arrival times. The arrival times are not restricted to be uniformly spaced and can have any time value. Then one constructs a circuit (FIG. 14A) using one or more rotational vector delays 306, 307 etc., shown in bold ovals, having $\tau_m$ and $R_m$ values for the $m^{th}$ echo which will create the set of echoes in the output described by the impulse response. Each rotational delay 306, 307 etc. represents the circuit 672 shown in the bold oval of FIG. 13A.

Figure 14A:
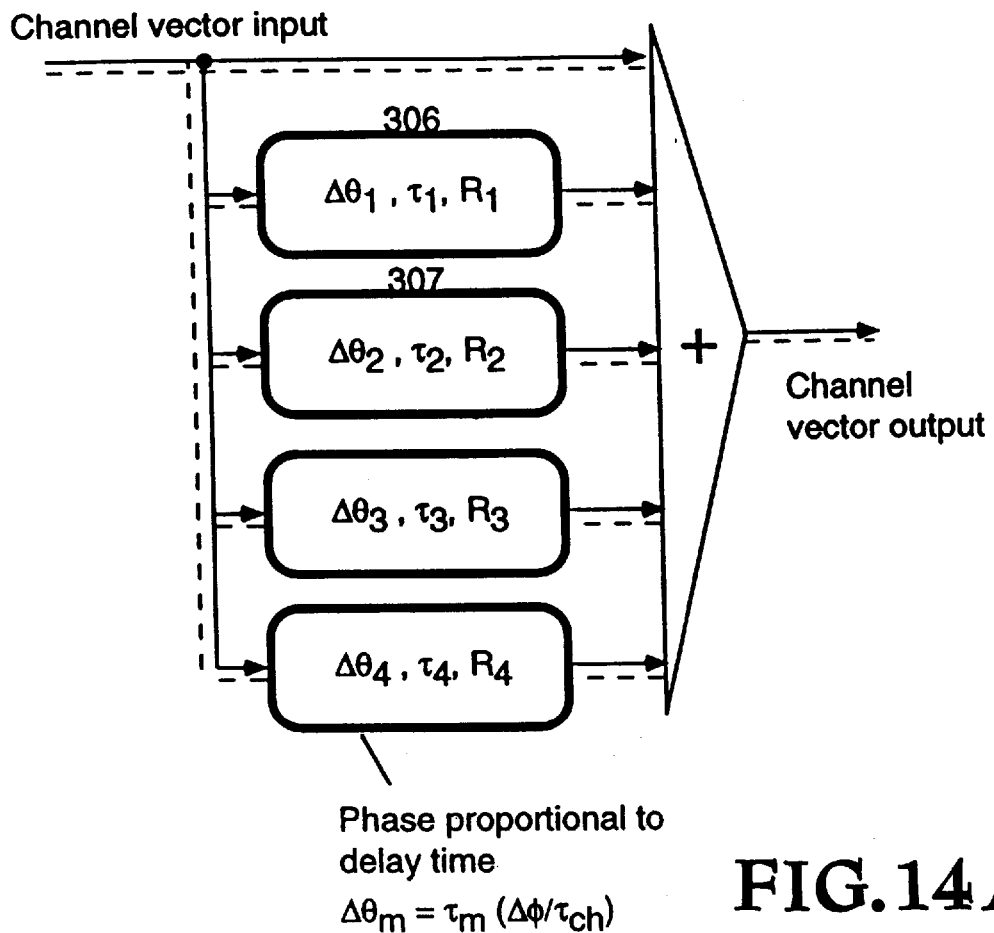
FIG. 14A shows a channel signal processor constructed of vector delays that realize a four-echo impulse response.
Figure 14B:
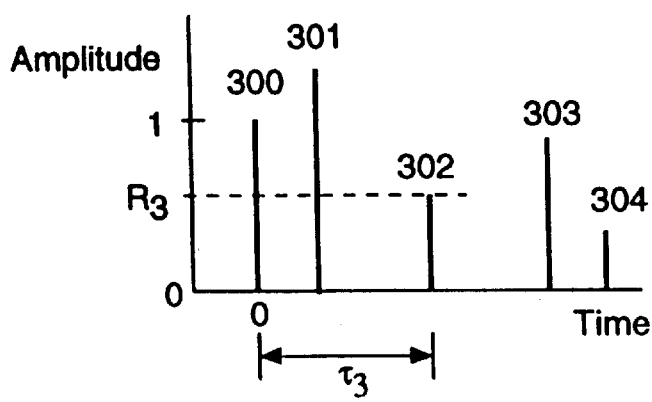
FIG. 14B shows a four-echo impulse response.
Figure 14C:
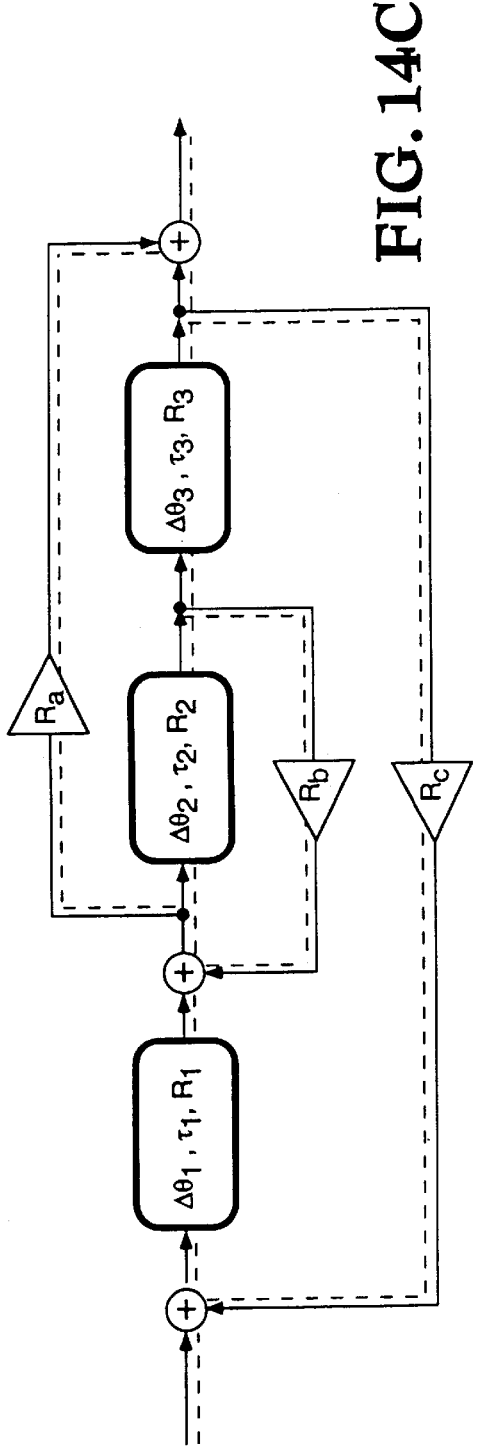
FIG. 14C shows a channel signal processor constructed of many recirculating paths which will produce a more complicated impulse response.

FIG. 14A shows an example circuit which would create the impulse response FIG. 14B having 4 echo spikes subsequent to the first spike. The paths comprising a dashed and undashed pair of lines represent vector signals. The manipulations (delay, addition, subtraction) act analogous to vector arithmetic in that they are performed on IF and *IF in parallel. FIG. 14C shows a more complicated channel filter using interwoven recirculation.

In order to slightly shift a channel filter spectrum in frequency, the phases $\Delta\theta_m$ associated with the $m^{th}$ spike of a filter impulse response FIG. 14B must be changed proportional to the arrival time of the spike in the impulse response. That is, $\Delta\theta_m=\Delta\phi(\tau_m/\tau_{ch})$, where $\Delta\theta_m$ is the phase shift of the $m^{th}$ rotating delay unit having delay $\tau_m$, and $\tau_{ch}$ is the characteristic delay of the channel filter. This can be set to one of the $\tau_m$ values, such as the echo having the largest amplitude.

Channel autocorrelator

An autocorrelation is a correlation of a signal with itself. It is useful to define an autocorrelation AC evaluated at τ of a function f(t) as $$AC(\tau) = Re \int dt\, f(t)f^*(t-\tau). \tag{Eq. 99}$$

The integral represents time averaging, which occurs over a duration much longer than $1/\beta_{ch}$. Time averaging can be performed by the invention either before or after up-heterodyning. However, practically it is simplest to do it before heterodyning and thereby eliminate the up-mixing step. This is done by summing the channel outputs produced by each channel autocorrelator to form the net autocorrelation output.

Figure 15A:
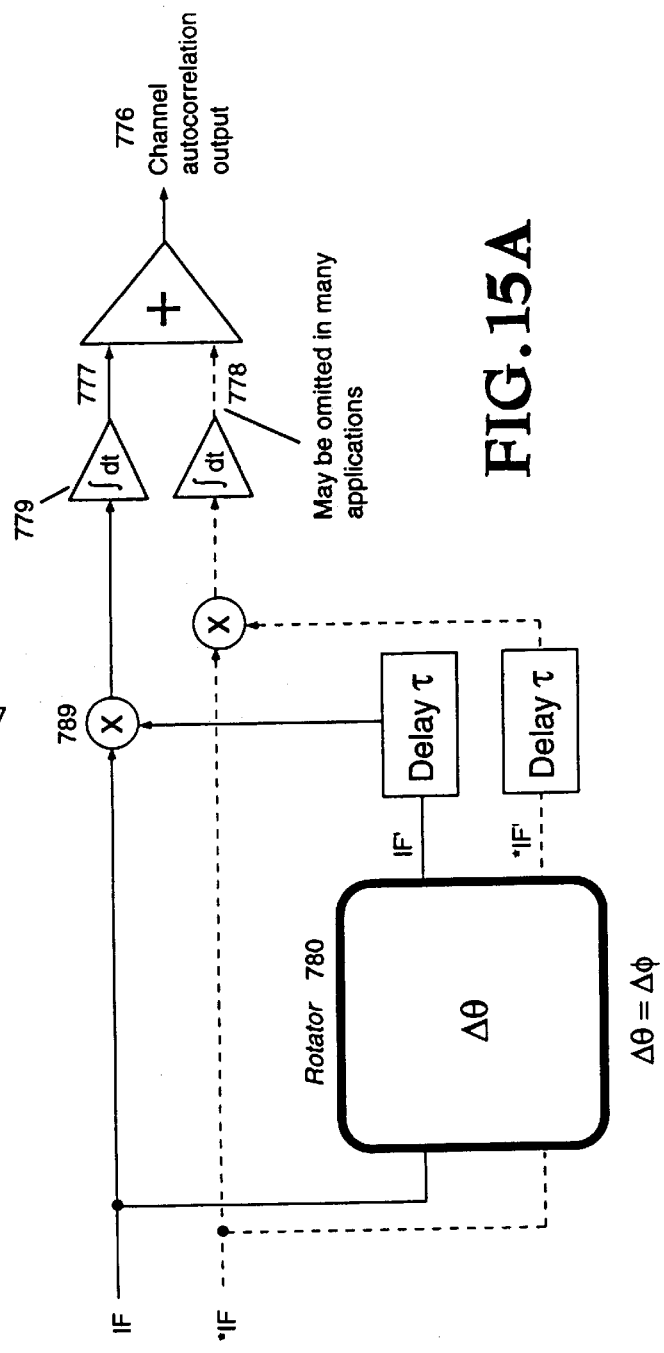
FIG. 15A shows a channel signal processor which is an autocorrelator having delay $\tau$ and signal rotation 66 $\theta$.

A channel autocorrelator is shown in FIG. 15A. Its output 776 is a sum of two separate autocorrelations, which could be called intermediate outputs or intermediate autocorrelations, one (777) from the IF signal, and a quadrature version 778 from *IF. Note, in some applications the quadrature intermediate output 778 can be omitted because signals which show correlations for the real part of the their Fourier spectrum often show the same correlation in the imaginary part. For example, in velocimetry applications, the illuminating interferometer ("A" in FIG. 2A or FIG. 18) creates the same comb-filter power spectrum for the real and imaginary parts of signal sent to the target.

Figure 15B:
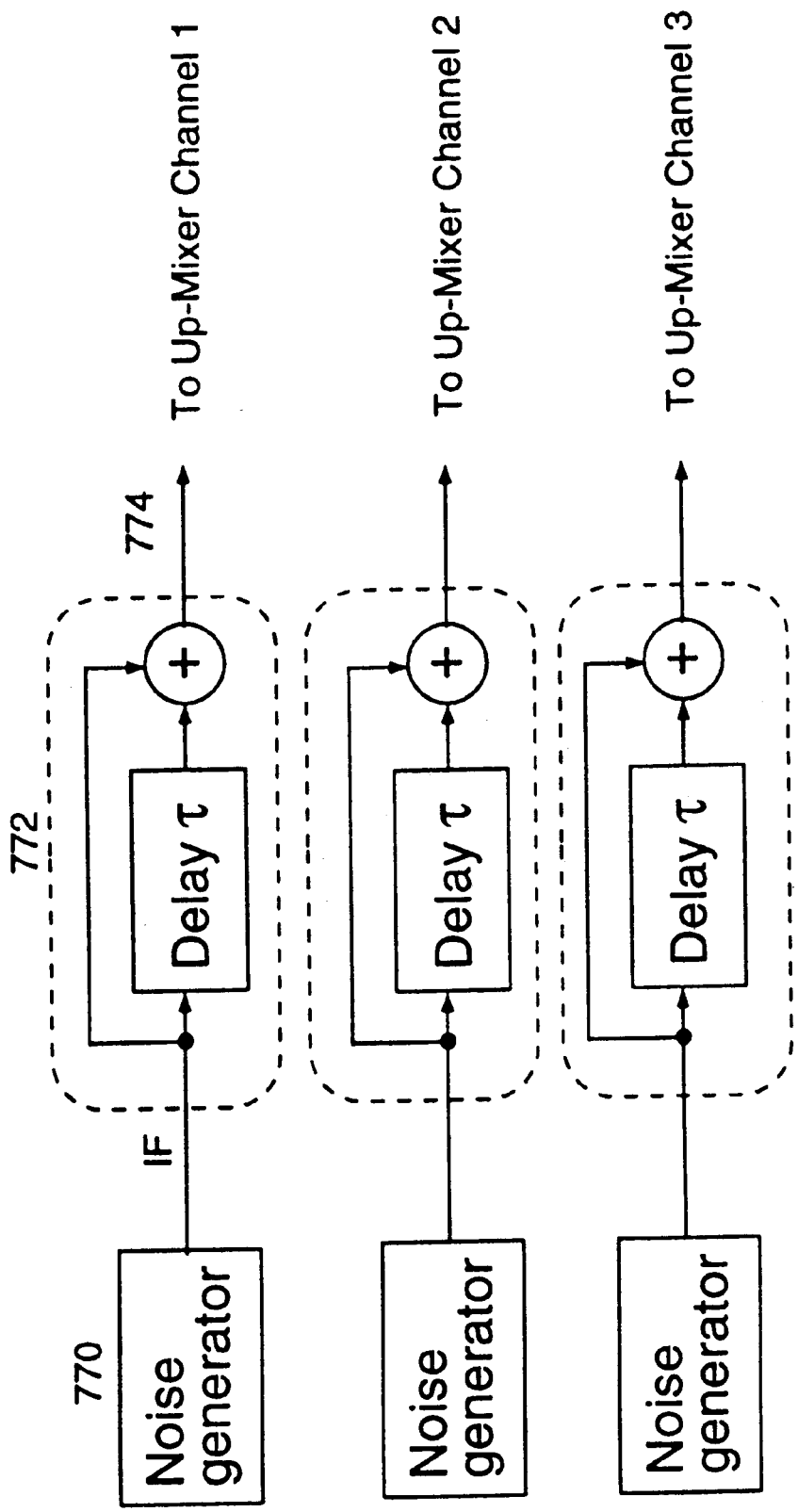
FIG. 15B shows channel waveform synthesis using multiple channel noise generators instead of spectrometer-produced signals.
Figure 15C:
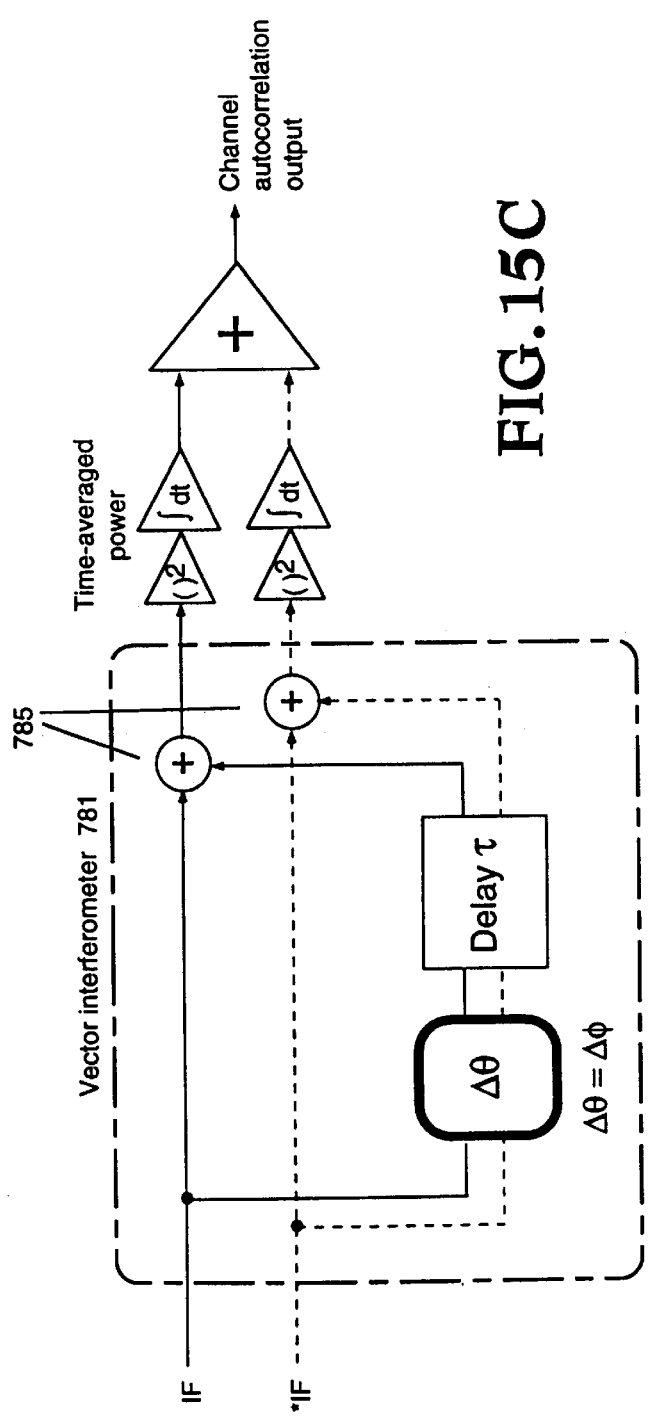
FIG. 15C shows a channel autocorrelator formed by measuring the time-average power passing through a vector interferometer.

It is convenient to implement the multiplication function 789 by passing a sum or difference of the two signals to be multiplied through a squaring function, or non-linear device, or power measuring device. FIG. 16C shows a simple ("lopsided") circuit that does this, analogous to the formula $(A+B)^2 = 2AB + (A^2 + B^2)$. When this is done, essentially the autocorrelation comprises measuring the time-averaged power passing through a vector interferometer 781, as shown in FIG. 15C, and ignoring any delay independent constants. That is, the time-averaged power of a signal f(t) passing through a two-path interferometer of delay τ is $$P_1(\tau) = \int dt |f(t)+f(t-\tau)|^2 = 2|f(t)|^2 + 2AC(\tau) \tag{Eq. 100}$$

where $|f(t)|^2$ is the undesired constant, and the second term is the desired autocorrelation.

A method which automatically deletes the undesired constant term is the push-pull method. This can be applied either before or after time-averaging. When applied before, it comprises a method of multiplication at 789 analogous to the formula $(A+B)^2 - (A-B)^2 = 4AB$. This form of push-pull is shown in FIG. 16B. When applied after, two separate interferometers analogous to FIG. 15C are required, except one of the interferometer subtracts the echo at 785 instead of adding it at 785 to the undelayed branch. Then in addition to the time-averaged power $P_1$ of the first interferometer, the time-averaged power $P_2$ of the second interferometer is found. This is $$P_2(\tau) = \int dt |f(t)-f(t-\tau)|^2 = 2|f(t)|^2 - 2AC(\tau). \tag{Eq. 101}$$

Then the two time-average power signals are subtracted and divided by four to form the autocorrelation $$AC(\tau) = (\tfrac{1}{4})[P_1(t) - P_2(t)]. \tag{Eq. 102}$$

This method automatically suppresses the $|f(t)|^2$ term. For clarity, circuits using the lopsided method are shown in the figures, but it is implied that the push-pull method can be substituted wherever the lopsided method is used.

Sinusoidal weighting after time-averaging

For processes such as correlations that output a time-averaged signal, there is another way of phase shifting the channel spectrum that avoids having to rotate the (IF, *IF) vector. Instead the unrotated IF and *IF are used as inputs. This could be called the "post-average weighting" technique. In this technique the sinusoidal linear combinations are applied after and not before the time-averaging. Therefore they operate on very low frequency, which reduces cost of components performing the arithmetic and makes it economical to calculate them for a variety of Δθ values in parallel. This allows economical evaluation of the correlation over a range of delays, in a snapshot, on the same set of IF vector data.

Figure 16A:
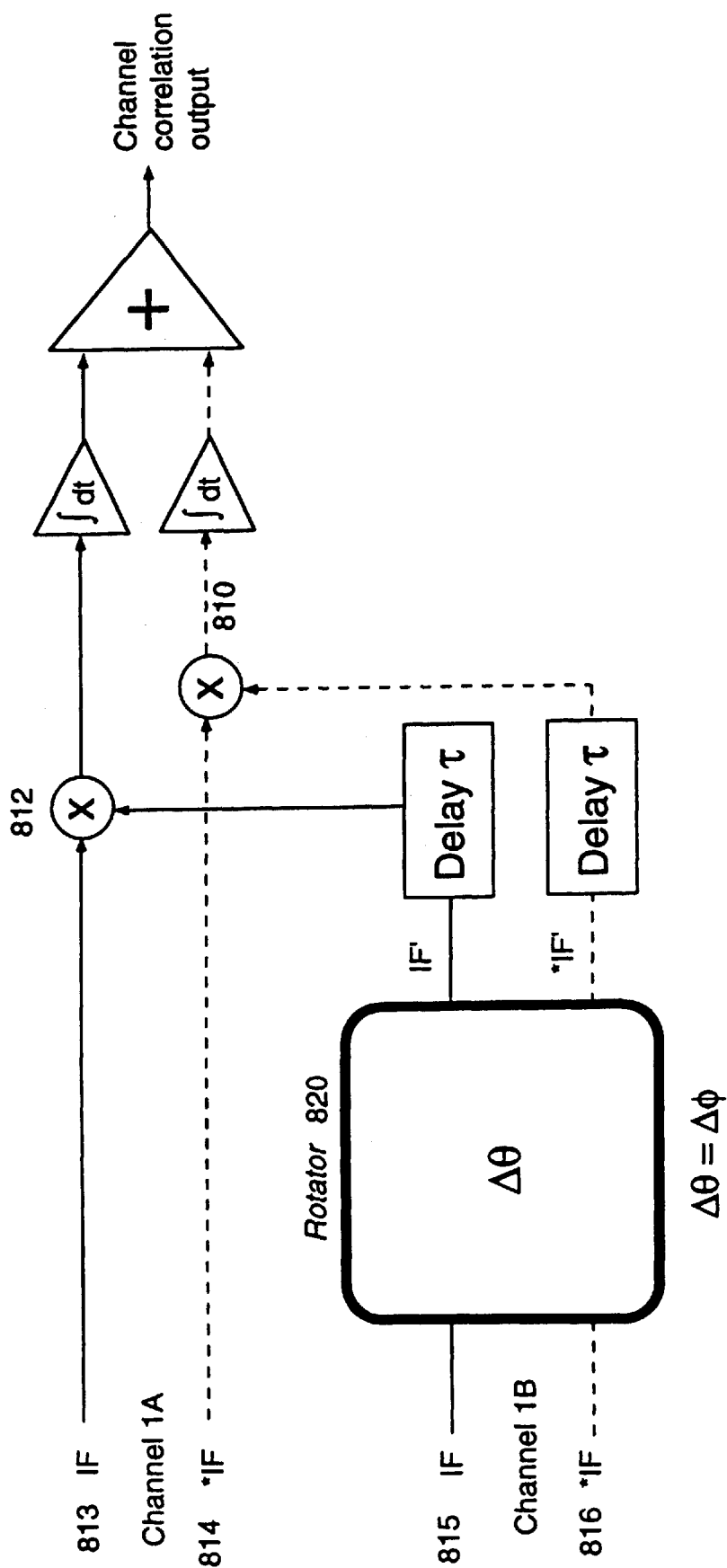
FIG. 16A shows a channel signal processor which is a correlator between A & B channels, having delay $\tau$ and signal rotation $\Delta\theta$.
Figure 16B:
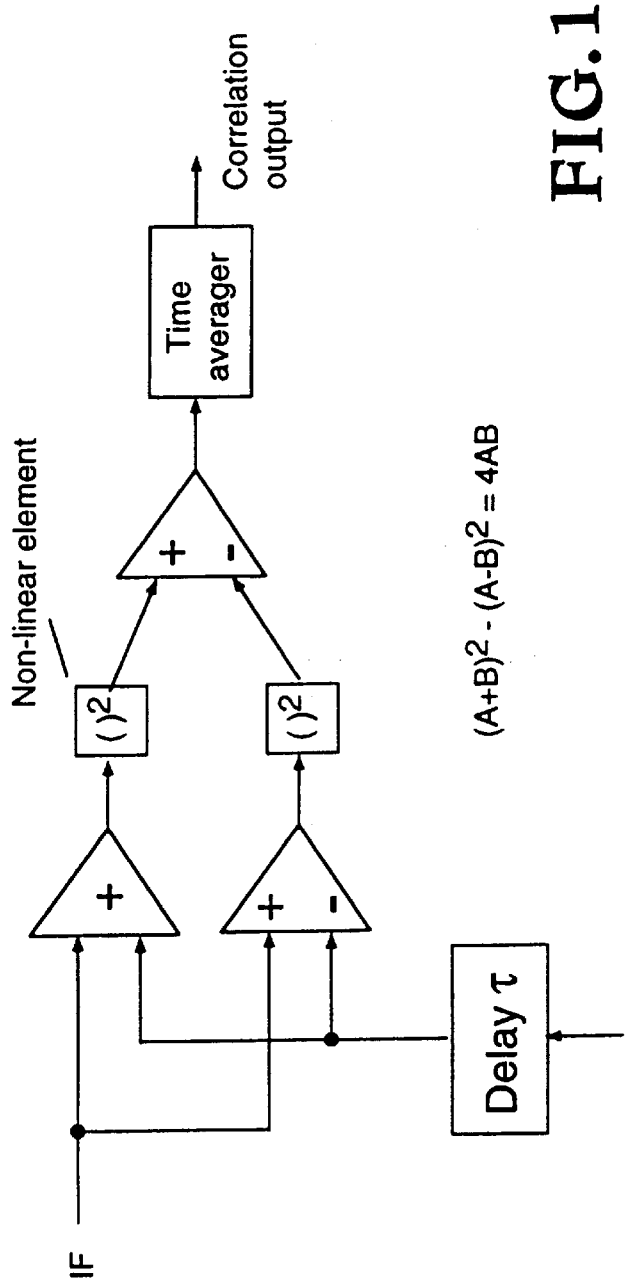
FIG. 16B shows that the multiplication function used in FIG. 16A can be accomplished by a push-pull arrangement of a non-linear element.
Figure 16C:
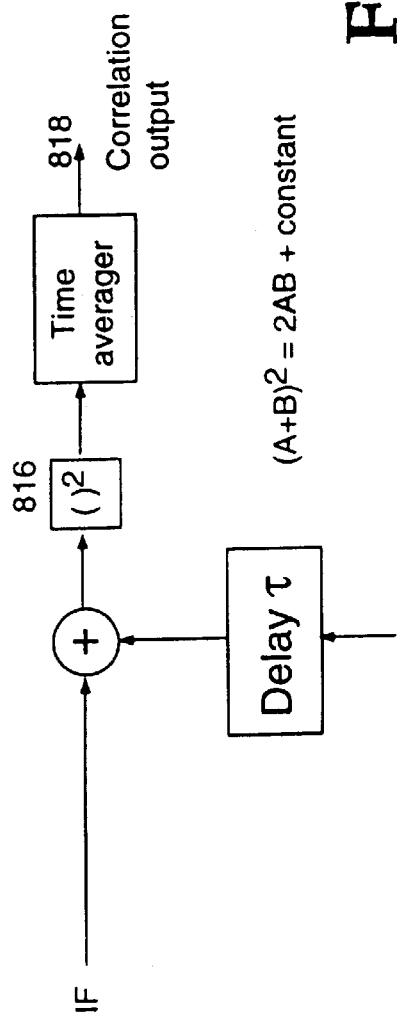
FIG. 16C shows the simple use of a non-linear element to create a correlation signal having an offset.
Figure 17:
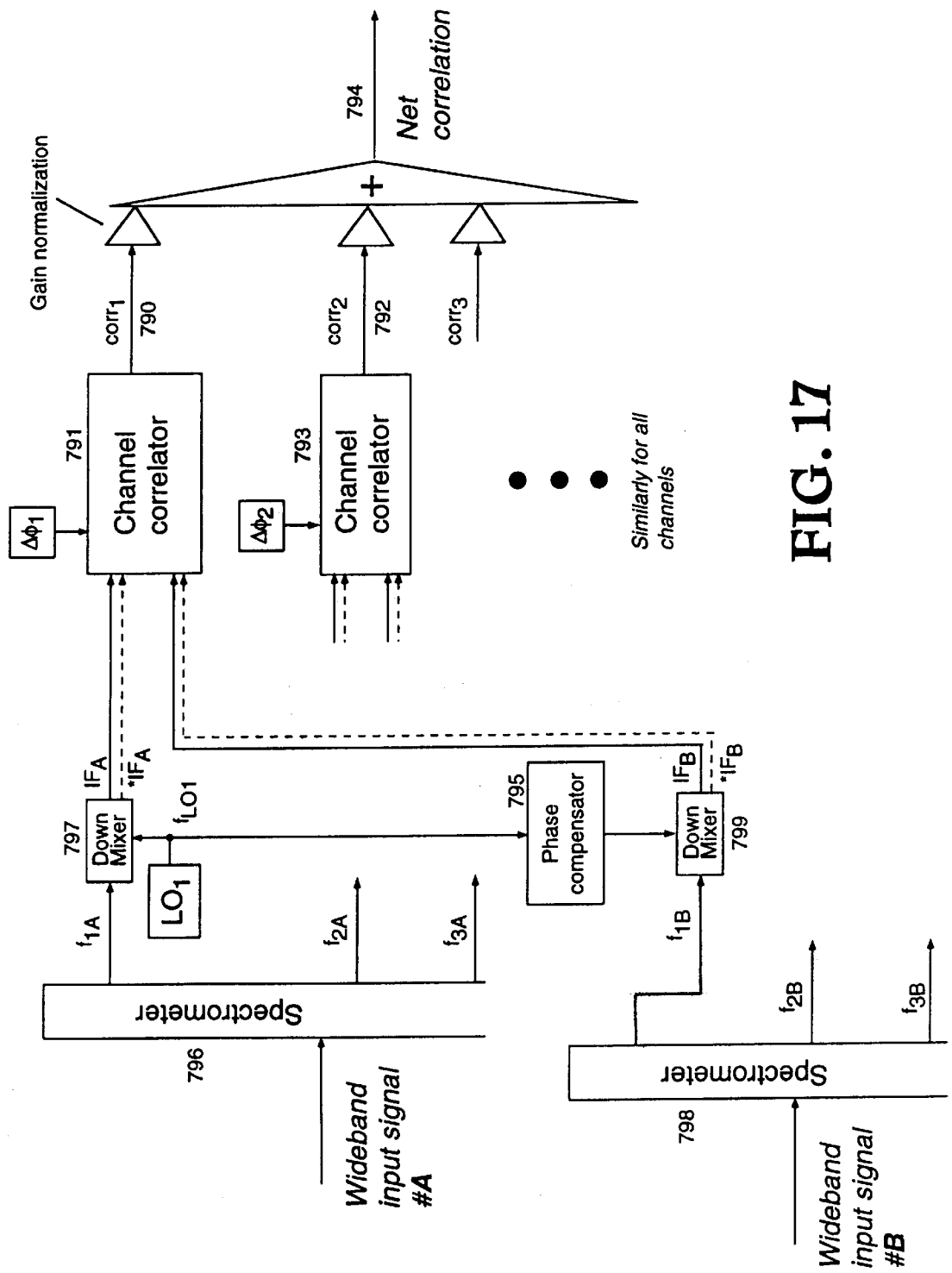
FIG. 17 is a schematic of a multiheterodyning correlator.

The mathematical basis for this is now given, for the general case of two-signal correlation. Let the two functions to be correlated be $$f(t) = f_r + if_i \text{ and } h(t) = h_r + ih_i, \tag{Eq. 200}$$

where $f_r$, $f_i$, $h_r$, $h_i$ are the real and imaginary parts of f(t) and h(t) and are directly analogous to the intermediate signals and their quadratures $IF_A$, $*IF_A$, $IF_B$ and $*IF_B$, shown in FIG. 17 and as 813–816 in FIG. 16A. Then a correlation between f(t) and h(t) is $$Cor(\tau) = Re \int dt f(t)h^*(t-\tau). \tag{Eq. 201}$$

Suppose we want to evaluate Cor(τ) for small deviations around τ=0 (for this demonstration it is immaterial what the coarse value of τ is). Then let τ be Δτ. Then because we can express a complex function in terms of Fourier components, we have $$h(t-\Delta\tau) \rightarrow e^{-\omega\Delta\tau}h(t) = e^{-i\Delta\theta}h(t) \tag{Eq. 202}$$

where we used the assumption that $\beta_{ch} \ll \beta_{net}$ so that the frequency ω in Eq. 202, which refers to frequencies of the input signal, is almost constant across a given channel. Thus ωΔτ can be approximately represented by a single value Δθ, for each channel. Equation 202 becomes $$h(t-\Delta\tau) \rightarrow e^{-i\Delta\theta}h(t) = h'_r + ih'_i \tag{Eq. 203}$$

where $$h'_r = h_r \cos \Delta\theta + h_i \sin \Delta\theta \tag{Eq. 204}$$

and $$h'_i = -h_r \sin \Delta\theta + h_i \cos \Delta\theta. \tag{Eq. 205}$$

This is the rotational transformation previously discussed to rotate the IF, *IF vector. Thus we have $$Cor(\Delta\tau) = Re \int dt f(t)h'^*(t) \tag{Eq. 206}$$

where h'(t) is the rotated form given by Eq. 204 and Eq. 205. Equation 206 is what is evaluated by the correlation circuit FIG. 16A, and by the autocorrelation circuit FIG. 15A [when h(t)=f(t)].

Now we will re-express Eq. 206 in another form that places the sinusoidal linear combinations Eq. 204 and Eq. 205 outside the time integrations instead of inside. Substituting Eq. 204 and Eq. 205 into Eq. 206 yields $$Cor(\Delta\tau) = Re \int dt (f_r + if_i)\{(h_r \cos \Delta\theta + h_i \sin \Delta\theta) - i(h_r(-1)\sin \Delta\theta + h_i \cos \Delta\theta)\}$$

which, after taking the real part of, becomes $$Cor(\Delta\tau) = \cos \Delta\theta \int dt f_r h_r + \cos \Delta\theta \int dt f_i h_i + \sin \Delta\theta \int dt f_r h_i - \sin \Delta\theta \int dt f_i h_r. \tag{Eq. 207}$$

Equation 206 shows that the channel correlation can be computed without rotating the IF vector, by first computing the intermediate correlations $$\text{Cor}_1 = \int dt\, f_r h_r,\ \text{Cor}_2 = \int dt\, f_r h_i,\ \text{Cor}_3 = \int dt\, f_i h_i,\ \text{Cor}_4 = \int dt\, f_i h_r \quad \text{(Eq. 208)}$$

that only involve the IF and its quadrature. That is using various combinations of IF against IF, IF against *IF, *IF against *IF etc. Then forming sinusoidal linear combinations of these intermediate correlations to produce the channel correlation.

Now for the case of an autocorrelation, $f_r = h_r$ and $f_i = h_i$, and the last two terms of Eq. 207 cancel, leaving $$AC(\Delta\tau) = \cos\Delta\theta \int dt\, f_r f_r + \cos\Delta\theta \int dt\, f_i f_i \quad \text{(Eq. 209)}$$

Figure 15D:
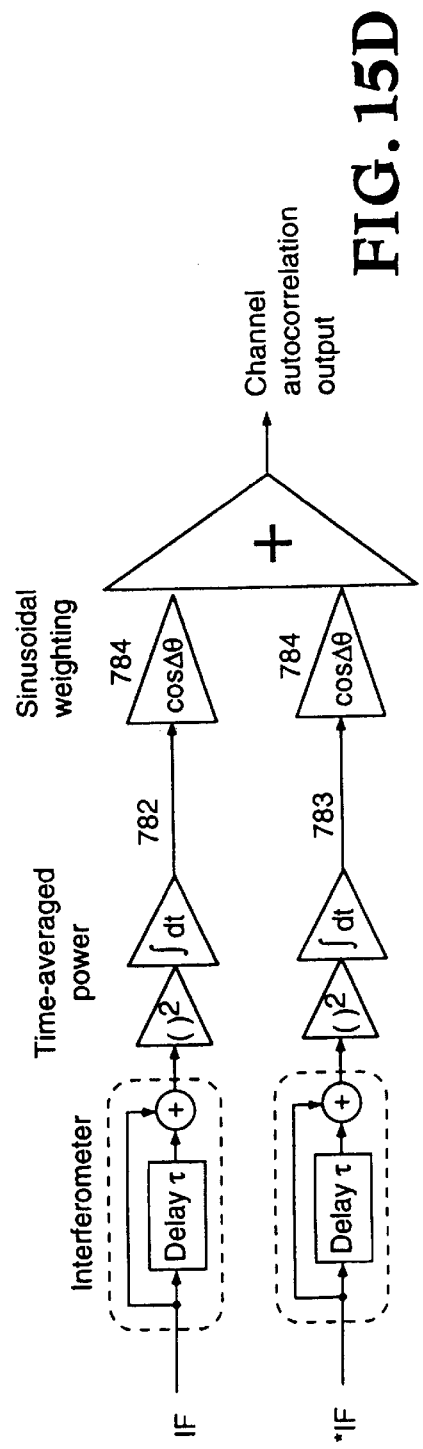
FIG. 15D shows a channel autocorrelator where the phase shifting is applied after the time averaging.

The circuit of FIG. 15D embodies Eq. 209, showing the autocorrelation calculated from a sum of two intermediate autocorrelations 782 and 783, with a sinusoidal coefficient 784. Note that in many situations, an input signal will show the same autocorrelation behavior in its real part as in its imaginary part. Thus, for economy the $\int dt\, f_i f_i$ term, which is calculated from *IF, can be omitted, and the *IF term does not have to be produced. This simplifies the down-mixer apparatus by eliminating the quadrature portion of it, and eliminating the need for retardation 758.

A important advantage of applying the sinusoidal linear combination after the time averaging is that it makes it economical to calculate the autocorrelation or correlation for a range of delay values $\tau$, without having to actually scan $\tau$ in real-time. Since the sinusoidal arithmetic is being performed on a very low frequency signal (a time-average), the arithmetic can be easily and rapidly evaluated for many values of $\Delta\theta$. This can produce a snapshot evaluation of $AC(\tau)$ or $\text{Cor}(\tau)$ over the range of $\tau$ accessible by coordinated channel phase shifting, a range $\tau \pm \Delta\tau_{max}$, where $\Delta\tau_{max}$ is defined in a later discussion and is limited by walkoff errors. This is much more rapid than actually scanning the channel delay, which would require dwelling on each delay value long enough for the time-averaging to occur.

Channel correlator

FIG. 17 shows a multiheterodyning correlator which correlates two wideband input signals #A and #B. Applications include correlating natural wideband signals such as starlight (FIG. 5), radio emitting stars, and artificially created signals such as illumination created a range finding radar, sonar or lidar (FIG. 2B and FIG. 19), or illumination from the "A" interferometer of a velocimeter (FIG. 2A and FIG. 18). Each channel pair 1A and 1B, 2A and 2B etc., are correlated separately by the channel correlator units 791, 793 etc. to produce channel correlation outputs 790, 792 etc. These outputs are summed to form the net correlation output 794. The same reference frequency $f_{LO1}$ is shared between channel 1A and 1B, and similarly for the other reference frequencies. The bandshapes produced for the A and B versions of each channel should optimally be as similar as possible. It may be possible in some embodiments to use the same physical spectrometer to implement spectrometers 796, 798 by having the A inputs and outputs displaced from the B input and outputs, displaced perpendicular to the wavelength direction.

The phase compensator 795 allows adjustment of the difference in arrival time of the reference signal between the down-mixers 797 and 799. This could correct for differences in propagation times in the cables routing the reference signal. These also provide an alternative method implementing the channel phase shifts, by providing another method of rotating the intermediate frequency signals, either rotating IF alone or the vector (IF, *IF). This method can be applied for all the signal processes, not limited to correlations. Equation 1 shows that a phase shift imparted to the reference or input signals will manifest that same phase shift for the corresponding down-heterodyned (IF) signal, and similarly for Eq. 1B and *IF. (The retardations could be applied to either input signal or reference signal, but for concreteness let us assume they are applied to the reference signals). Hence retarding the arrival time of the reference signal at "B" down-mixer 799 relative to "A" down-mixer 797 causes a phase shift equivalent to changing $|\Delta\theta|$ and hence $|\Delta\phi|$. In an interferometer process, for example, instead of obtaining the rotated vector (IF', *IF') from a rotator block (650 in FIG. 12A), the rotated (IF', *IF') signals could be obtained from a down-mixer unit having an adjustably retarded reference signal. In order to rotate by a positive $\Delta\theta$, the retardation of the reference signal would be negative $\Delta\theta$. In optical embodiments of the multiheterodyning processor, the adjustable retardance of the reference beam or input beam can be implemented electro-optically. Collectively (for all channels) changing the arrival time of the reference signal to the down-mixer, such as by changing a path length, is a method of changing the net delay of the correlating device.

FIG. 16A shows a channel correlator. It comprises two independent correlators whose outputs are summed, one from the IF signal and one from the *IF signal. The multiplication function 812 could be implemented by a coincidence gate, such as when photon-counting detectors are used. Nominally $\Delta\theta = \Delta\phi$.

Correlating more than two inputs (such as A, B, C, D, E) can be done by constructing a circuit analogous to FIG. 16A that has multiple vector inputs and implements whatever mathematical definition of a multi-variable correlation the user desires. This includes finding the time average of the square of the sum of the inputs.

Figure 16D:
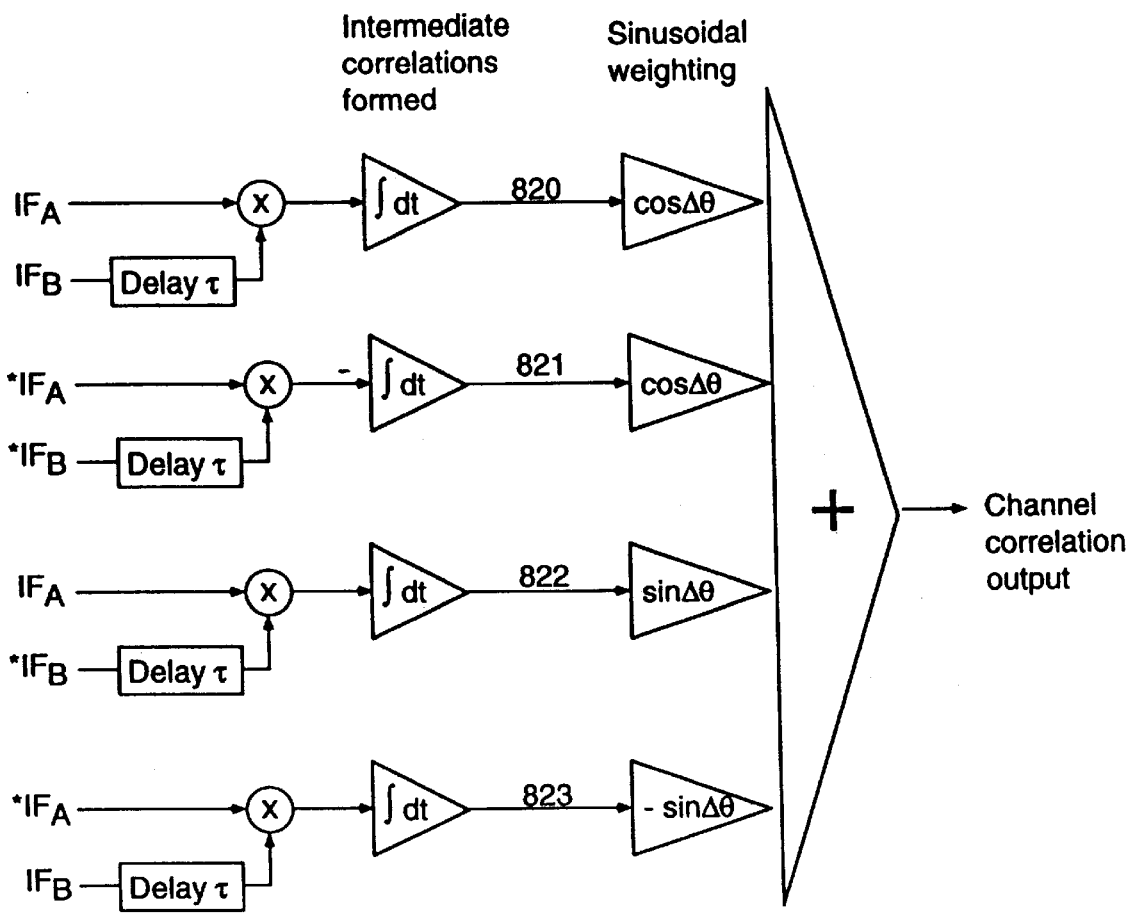
FIG. 16D shows a channel correlator where the phase shifting is applied after the time averaging.

FIG. 16D shows how the correlation can be performed using the post-averaging weighting method, by forming a sinusoidal linear combination of intermediate correlations 820, 821, 822, 823, as described by Eq. 207. Each intermediate correlation is a correlation between combinations of IF and *IF. This method is advantageous when the down-heterodyned signal is detected by a photon-counting system, and a coincidence gate used for the multiplication function of the correlator. This way, the sinusoidal linear combination can be applied to cumulative output of the coincidence gate, which is a slowly changing signal, rather than the higher bandwidth pulses constituting the IF signals.

Channel recorder

Figure 12C:
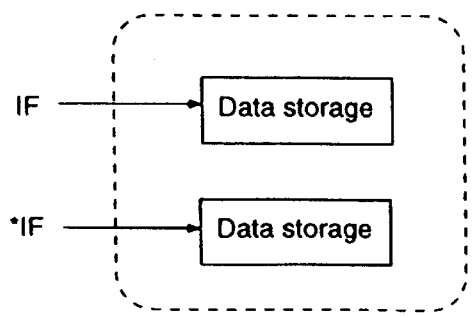
FIG. 12C shows a channel signal processor which records the IF and quadrature IF signals.
Figure 12D:
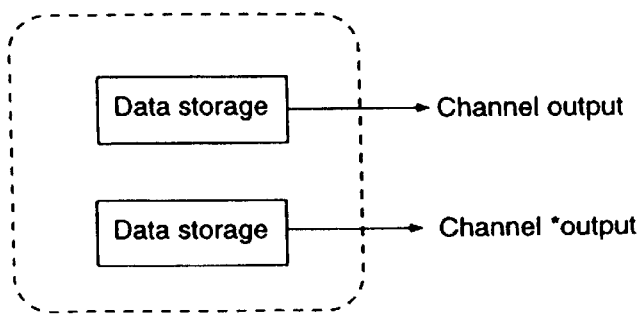
FIG. 12D shows a channel signal processor which synthesizes the channel and quadrature channel outputs.

FIG. 12C shows a channel recorder which stores the IF vector signals for later use. At the time of measurement, the frequencies $f_{LOn}$, relative phases, and amplitudes of the reference signal are also measured. The input signal can be recreated from this stored information by Fourier reconstruction.

Channel waveform synthesizer

For the process of waveform synthesis, vector channel outputs sent to the up-mixer are ersatz and can be taken from stored data, or from some real-time channel process not based on a high frequency ($\sim\beta_{net}$) input. For example, FIG. 15B shows how to generate a high bandwidth noise signal having a comb-filter power spectrum, such as for use in velocimetry (FIG. 2A). Each channel 774 could have a noise generator 770 that passes through a channel interferometer 772. That is, instead of using a single high bandwidth noise generator as a high frequency input (1 in FIG. 1) passing through a spectrometer 5, the noise could be generated at the channel level in a parallel manner by many lower bandwidth noise generators. Thus a spectrometer is not needed. Furthermore, this random signal 770 does not have to be vectorized for velocimetry applications, since the phase of the signal 104 leaving the first interferometer 102 is immaterial. ps Combination Signal Processes A combination of channel signal processes can be applied to the channelized intermediate frequency signals in an overall parallel manner to implement a combined wideband signal process. The combinations can include the channel signal processes already discussed, and arithmetic operations such as adding and subtraction of input signals. Let $s_1$, $s_2$, $s_3$, etc. be channel signal processes, called component processes, and $f(s_1, s_2, s_3, \ldots)$ be a network of these, where outputs of any component process $s_x$ could be used as part of the input of any other component process $s_y$. That is, we are not restricted to simple sequences $s_1$ to $s_2$ to $s_3$ etc. Then this will form a multiheterodyning device that acts on the wideband input signal analogous to $f(S_1, S_2, S_3 \ldots)$, where $S_1$, $S_2$, $S_3$ etc. are the individual effect on a wideband signal by $s_1$, $s_2$, $s_3$.

In other words, going from the output of one multiheterodyning apparatus to the input of another we can omit the steps of up-heterodyning, summation over channels, then spectral decomposition into the same channels, and down-heterodyning. This is because there is no point to up-heterodyning and then immediately down-heterodyning, and no point to summing over channels and then immediately decomposing into the same channels. Effectively we can move these steps to outside the network $f(s_1, s_2, s_3, \ldots)$. Generally, it is advantageous to keep the wideband signal information expressed as a parallel set of intermediate frequency signals as long as possible, postponing the steps of up-heterodyning and summation over channels.

Calculating desired channel phase shifts
Plotting phase versus frequency

The most important parameter describing the behavior of a signal process is the phase $\phi = f\tau$. Thus it is extremely useful to refer to FIG. 8A, which plots $\phi$ versus f. A phase-linear device having delay $\tau$ is represented by a line $\phi = f\tau$. The long thin lines 600 and 602 are "global" lines $\phi = f\tau_{net}$ representing the effective net delay $\tau_{net}$ of a multiheterodyning device. (The difference in slopes between lines 600 and 602 has been greatly exaggerated relative to their absolute slope for clarity.) The delay created by an individual channel is a bold short line (such as 604) of horizontal extent $\beta_{ch}$, having slope $\tau_{ch}$, and called a "channel segment". These $\tau_{ch}$ values can have individually different values ($\tau_{ch,n}$) from channel to channel. The global lines are best-fit lines through all the channel segments, weighted by the detailed shape of the channel bands.

Since phase is periodic with periodicity of 1 cycle or $2\pi$ radians, the channel segment and global lines can be equivalently translated vertically any integer number of cycles on FIG. 8A.

An initially phase-nonlinear device

When no channel phase shifts are applied, the channel segments initially lay on the horizontal axis, with their left (low frequency) ends at coordinates ($f = f_{LOn}$, $\phi = 0$), and having slopes $\tau_{ch,n}$. However, due to the periodicity of phase, the channel segments can be raised vertically by adding any integer number of cycles. Then a global line which is a best-fit line through all the channel segments is attempted to be found. However, for arbitrary values of $f_{LOn}$, it is unlikely that there will be a very good fit, as there will be random phases, some too high and some too low. Thus, a non-phase linear device will probably result from arbitrary choice of $f_{LOn}$.

Bringing it into phase-linearity

Bringing the net device into phase-linearity is equivalent to raising each channel segment by an amount $\Delta\phi_{lin}$ so that the "center of mass" of the channel segment at $f_{ave}$ falls along a global line. The global line 600 has a "nominal"

delay $\tau_{net} = \langle \tau_{ch} \rangle$. Global line 602 describes a slightly larger delay, $\tau_{net} = \langle \tau_{ch} \rangle + \Delta\tau$, created by altering the channel phase shifts by an additional amount $\Delta\phi_{dil}$.

Creating small changes in delay

The $\Delta\phi_{dil}$ phase shifts can be used to create small changes $\Delta\tau$ in $\tau_{net}$ while holding $\tau_{ch}$ constant for all channels. Phase shifts cannot be used to create large changes in $\tau_{net}$, because then the slope of the channel segments becomes too different from $\tau_{net}$, creating walkoff errors $\Delta\phi_{walkoff}$ (608 in FIG. 8B). The walkoff error is approximately $$\Delta\phi_{walkoff} = (\tfrac{1}{2})\beta_{ch}(\tau_{net} - \tau_{ch,n}) \approx (\tfrac{1}{2})\beta_{ch}\Delta\tau. \quad \text{(Eq. 10)}$$

When the walkoff errors grow beyond approximately $\pm\tfrac{1}{4}$ cycle, de-phasing of the channels makes the multiheterodyned output incoherent, and thus no-longer useful for double interferometer velocimetry or correlation measurements. Thus the maximum practical dilation is $$\Delta\tau_{max} \approx (\tfrac{1}{2})/\beta_{ch}. \quad \text{(Eq. 11)}$$

To create a larger delay change than $\Delta\tau_{max}$ requires changing ch, in addition to re-adjusting the channel phasing.

Note that this result assumes $\Delta\theta$ and hence $\Delta\phi$ is independent of intermediate frequency. A positive frequency dependence to $\Delta\theta$ and $\Delta\phi$ would increase the slope of the segment and change the walkoff error. This would reduce walkoff and raise $\Delta\tau_{max}$ for positive $\Delta\tau$, and increase walkoff and reduce $\Delta\tau_{max}$ for negative $\Delta\tau$.

Master phase equation

To achieve a coherent delay, we find the phase shifts $\Delta\phi_n$ that put the "center" (located at $f_{ave}$) of each channel segment along a global line having a slope net. Thus $$(\tfrac{1}{2})\beta_{ch}\tau_{ch,n} + \Delta\phi_n = [f_{LOn} + (\tfrac{1}{2})\beta_{ch}]\tau_{net} \quad \text{(Eq. 12)}$$

which becomes $$\Delta\phi_n = [f_{LOn} + (\tfrac{1}{2})\beta_{ch}]\tau_{net} - (\tfrac{1}{2})\beta_{ch}\tau_{ch,n}. \quad \text{(Eq. 13)}$$

This is a master equation from which we can derive other results. The subscript n denotes that the value is individual to a particular channel #n. For clarity, let us redefine $\beta_{ch}$ so that given $f_{LO}$ and $f_{ave}$ we always have $$[f_{LOn} + (\tfrac{1}{2})\beta_{ch,n}] = f_{ave,n}. \quad \text{(Eq. 14)}$$

This way, the Eq. 13 will also be valid for asymmetrical bandshapes.

Let us suppose that all the channel delays are the same within a given multiheterodyning unit, so that $\tau_{ch,n} = \langle \tau_{ch} \rangle$ in Eq. 13. (We will allow them to be different between units A and B, but same within A, and within B). This is reasonable if the delays are implemented by shift registers driven by a shared clock frequency. Let us describe the net delay as a deviation from a nominal delay $\tau_{net} = \langle \tau_{ch} \rangle + \Delta\tau$. Then Eq. 13 becomes $$\Delta\phi_n = f_{LOn}\langle\tau_{ch}\rangle + f_{ave,n}\Delta\tau = \Delta\phi_{lin,n} + \Delta\phi_{dil,n}. \quad \text{(Eq. 15)}$$

The first term is the phase shifts $\Delta\phi_{lin,n}$ required to bring the net device into phase-linearity, the second term is the additional phase shifts $\Delta\phi_{dil,n}$ required to change (dilate) the delay.

$$\Delta\phi_{lin,n} = f_{LOn}\langle\tau_{ch}\rangle \quad \text{(Eq. 16) and}$$

$$\Delta\phi_{dil,n} = f_{ave,n}\Delta\tau. \quad \text{(Eq. 17)}$$

When using a pair of devices sharing fLO

Now suppose we have a pair of multiheterodyning units "A" & "B" that are being compared, such as to form a correlator or a double interferometer velocimeter, and which share the same reference frequencies $f_{LOn}$. Since it is only a relative measurement, we need only change one of the unit's $\tau_{net}$, say unit B's. The analysis below assumes the channel delays and phases of unit A will remain the same, while we adjust the channel delays and phases of unit B. From Eq. 15 we have for the A and B channel phases $$\Delta\phi_{n,A} = f_{LOn} <\tau_{ch}>_A \quad \text{(Eq. 18)}$$

$$\Delta\phi_{n,B} = f_{LOn} <\tau_{ch}>_B + f_{ave,n}\Delta\tau. \quad \text{(Eq. 19)}$$

Because a correlation or velocimetry measurement only cares about a comparison between A and B within each channel, we are allowed to add an arbitrary constant $\text{Con}_n$ to both A and B that could change from channel to channel.

$$\Delta\phi_{n,A} = f_{LOn} <\tau_{ch}>_A + \text{Con}_n \quad \text{(Eq. 20)}$$

$$\Delta\phi_{n,B} = f_{LOn} <\tau_{ch}>_B + f_{ave,n}\Delta\tau + \text{Con}_n \quad \text{(Eq. 21)}$$

Now suppose we make the delays of A and B units the same, $<\tau_{ch}>_A = <\tau_{ch}>_B = <\tau_{ch}>$. This is fairly easy to do if the delays are implemented by shift registers driven by the same clock frequency. Now Eq. 20 and Eq. 21 proves that it is permissible to ignore the $\Delta\phi_{lin}$ terms for a correlator or velocimeter when the $f_{LOn}$ are shared between the units, because that is equivalent to having $\text{Con}_n = -f_{LOn} <\tau_{ch}>_A$ so that $$\Delta\phi_{n,A} = 0 \quad \text{(Eq. 22)}$$

$$\Delta\phi_{n,B} = f_{ave,n}\Delta\tau. \quad \text{(Eq. 23)}$$

Thus the simplest application of a correlator or velocimeter sharing reference frequencies is to set all the channel phases to zero for both A and B units, and the channel delays the same for A and B units. This is sufficient to adjust $\tau_{netB}$ over a small range $<\tau_{ch}> \pm \Delta\tau_{max}$. For a larger range, we need to change both $\Delta\tau$ and $\tau_{ch}$. The analysis below shows how.

Note that the net delay for this invention is more precise than possible from a single channel used alone, because the slope of the global line is based on the average of many channel segments. Furthermore, if all the channel delay values $\tau_{ch,n}$ drift in the same direction, such as if they are shift registers driven by the same clock frequency, then $\tau_{net}$ does not change because that is equivalent to translating the global line vertically without changing its slope. Thus the temporal behavior of the multiheterodyning device is more precise and stable than a single channel used alone.

In order to increase $\tau_{netB}$ further than $\Delta\tau_{max}$ we must increase $<\tau_{ch}>_B$. In a shift register implemented channel delay, $\tau_{ch}$ will be naturally quantized in increments of a clock period, which we will call $\Delta\tau_{ch}$. So let $$<\tau_{ch}>_A = <\tau_{ch}> \quad \text{(Eq. 24)}$$

$$<\tau_{ch}>_B = <\tau_{ch}> + k\Delta\tau_{ch}, \quad \text{(Eq. 25)}$$

where k is an integer which describes which delay range we are in. Then we could have $$\Delta\phi_{n,A} = 0 \quad \text{(Eq. 26)}$$

$$\Delta\phi_{n,B} = f_{LOn}\Delta\tau_{ch}k + f_{ave,n}\Delta\tau = \Delta\phi_{lin,n} + \Delta\phi_{dil,n} \text{ for } k=0,1,2 \ldots \quad \text{(Eq. 27)}$$

$$\tau_{netB} = <\tau_{ch}> + k\Delta\tau_{ch} + \Delta\tau \quad \text{(Eq. 28)}$$

$$\tau_{netA} = <\tau_{ch}>. \quad \text{(Eq. 29)}$$

These four equations describe the configuration to use in a two unit correlator or velocimeter when reference frequencies are being shared, and when some simplifying assumptions where used. For any circumstances, the exact result can be computed from the master equation Eq. 13.

If the channel delays are not exactly the same between A and B units, this can be compensated for by adding a phase adjustment to the B channels of $(\frac{1}{2})\beta_{ch}(\tau_{ch,n,B} - \tau_{ch,n,A})$.

Figure 8B:
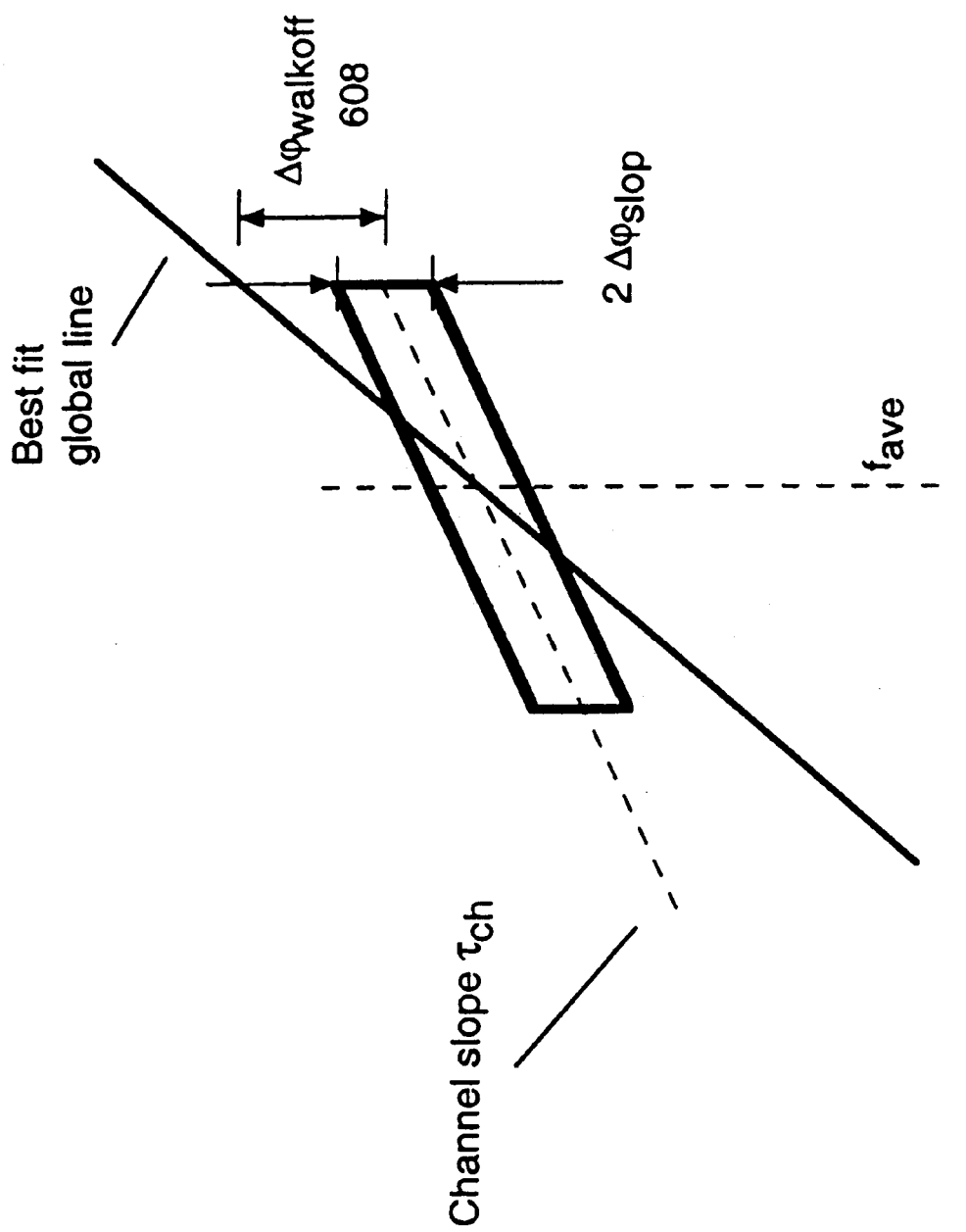
FIG. 8B is a close-up of FIG. 8A where the segment representing a phase-shifted channel meets a global line representing behavior of the net multiheterodyning device.

FIG. 8B shows a close-up of FIG. 8A where a channel segment intersects a global line. The channel segment is shown as a rectangle of vertical thickness $2\Delta\phi_{slop}$ to represent uncertainties in $\tau_{ch}$, $\Delta\theta$, and variation of $\Delta\theta$ with intermediate frequency. Instead of assuming a constant $\Delta\theta$, the most accurate analysis of FIG. 8A would include the actual frequency dependence of $\Delta\theta$. This could make the channel segment curved. For shift register delays driven by the same clock frequency, $\Delta\phi_{slop}$ could be insignificant compared to $\Delta\phi_{walkoff}$.

Numerical example of choosing phase shifts

Let us give a numerical example using a 100 channels of $\beta_{ch}$=200 MHz, filling an input bandwidth from 10 GHz to 30 GHz so that $\beta_{net}$=20 GHz. Each channel has a shift register delay driven by a dock frequency which must be greater than 400 MHz (according to the Nyquist criteria) in order for $\beta_{ch}$=200 MHz. Thus we can increment the shift register delay in quanta of $\Delta\tau_{ch}$=1/(400 MHz)=2.5 ns. Let the starting value of the shift register delay be $\tau_{ch}$=2 ms=2000000 ns. We can set $\Delta\tau$ in Eq. 27 to any value from zero to a maximum value of $\Delta\tau_{max} \sim (\frac{1}{2})/\beta_{ch} \sim 2.5$ ns, which is when dephasing begins. Note that conveniently, $\Delta\tau_{max} \approx \Delta\tau_{ch}$, so that just as dephasing begins we can jump to a new delay range by increasing $\tau_{chB}$ by $\Delta\tau_{ch}$, from 2000000 ns to 2000002.5 ns etc.

We start with all shift register delays set to $\tau_{ch}$=2000000 ns, k=0, and $\Delta\tau$=0, and we set all the phase shifts to zero according to Eq. 26 and Eq. 27. The net delay is the nominal value $\tau_{net}$=2000000 ns. We are in the lowest delay range, and we can adjust $\tau_{net}$ from 2000000 ns to 2000002.5 ns by adjusting channel phases according to Eq. 27, by increasing $\Delta\tau$, up to $\Delta\tau$=2.5 ns. At this point we jump to a new delay range by incrementing k to 1 and reseting $\Delta\tau$ to zero. That is, now all the B-units shift register delays will be at 2000002.5 ns. The channel phases are nonzero because of the first term. The second term is zero. Now we can increase $\tau_{net}$ from 2000002.5 ns to 2000005 ns by increasing $\Delta\tau$ from 0 to 2.5 ns and adjusting phases according to Eq. 27. And so on. Thus by the combination of changing the delay on a fine level with phases and on a coarse level by the shift registers, we can create any delay with very fine resolution.

Practical advantages of sharing reference frequencies

The invention is very practical because in some embodiments it is not necessary to assign the reference frequencies $f_{LO1}$, $f_{LO2}$, $f_{LO3}$, etc. to any precise set of values. They and their associated channel bandshapes can be approximately scattered across the bandwidth $\beta_{net}$. This is a great practical advantage because it allows the use of inexpensive oscillators that may drift in frequency over time. (The frequency must not drift significantly over the delay time, but this is easily achieved.) Secondly, the detailed shape of the bandshape does not critically affect the autocorrelation or correlation in many embodiments (provided it is the same for all channels A, B, etc. sharing a given reference frequency). Thus inexpensive spectrometers and electrical components can be used. Thirdly, for many situations a variance in $\tau_{ch}$ among channels is acceptable because channel phase adjustment can compensate for it. This reduces cost of components creating the channel delay.

Tolerance for reference frequency drift

The tolerance to frequency drift for the reference frequencies can be estimated. The peak to peak spacing of the comb-filter is 1/τ. Suppose we want the drift in frequency to be less than 10% of a comb-filter peak-to-peak spacing (1/τ), and this drift occurs over a duration of τ or the round trip time of the signal from apparatus to target and back, whichever is greater. For radars, the latter and former could be about the same, and be about 2 ms. Thus we desire (10%)(1/[2 ms])=50 Hz stability over a 2 ms interval, or 25 kHz per second stability for a frequency that may be about 30 GHz. This is about 1 part per million per second stability, which is achievable.

An autocorrelator sharing reference frequencies

Figure 18A:
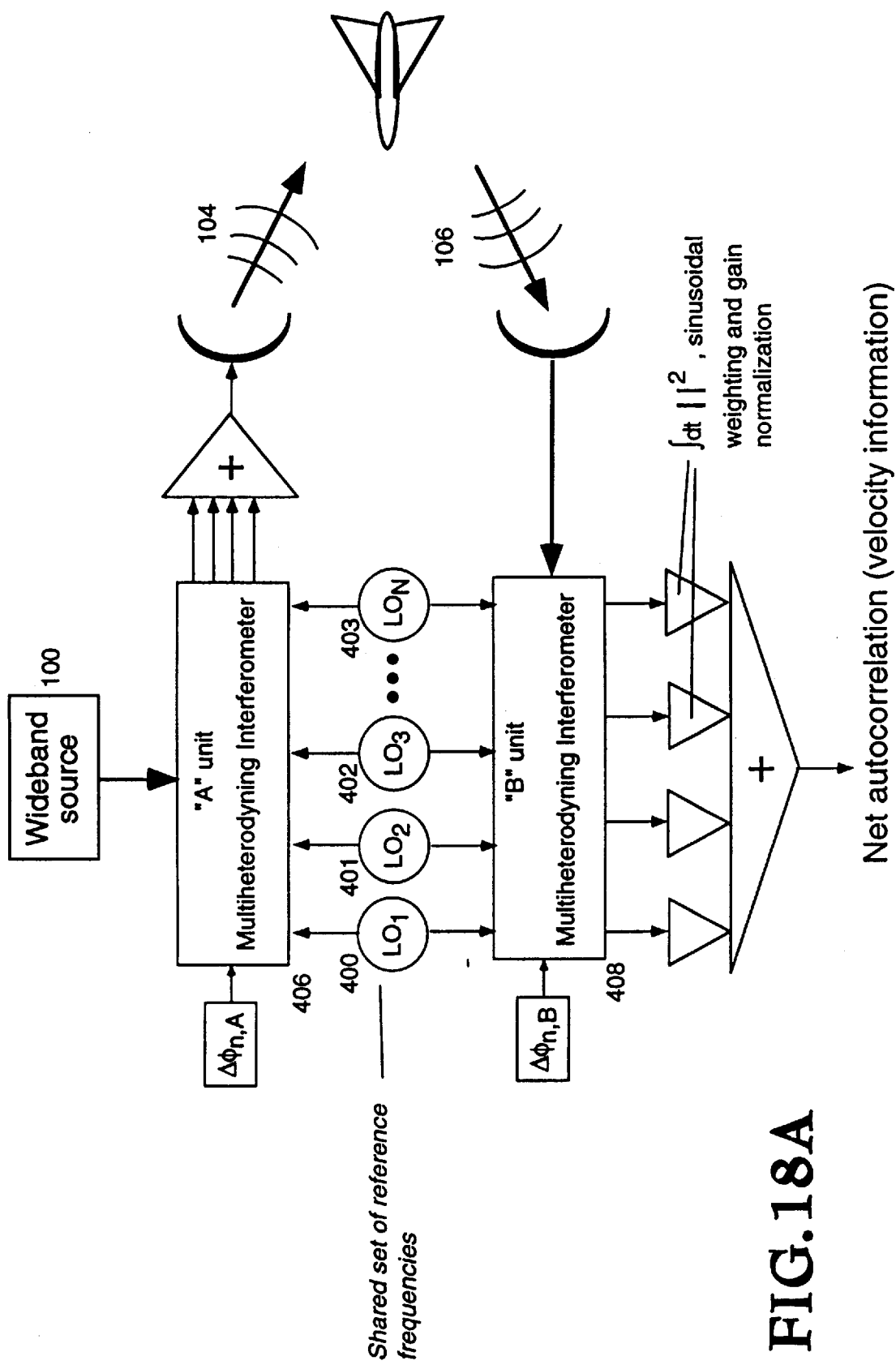
FIG. 18A shows a double interferometer velocimeter using two matched multiheterodyning interferometers sharing reference frequencies.

FIG. 18A shows an embodiment of the invention forming a double interferometer velocimeter analogous to FIG. 2A. The set of local oscillators 400, 401, 402, 403 etc. supply reference frequencies shared between two multiheterodyning interferometer units "A" and "B" (406 and 408). Phase compensators analogous to 510 in the correlator (FIG. 19A) are not necessary in this velocimetry application because the detecting interferometer ("B") only cares about the power spectrum and is not phase sensitive.

Figure 18B:
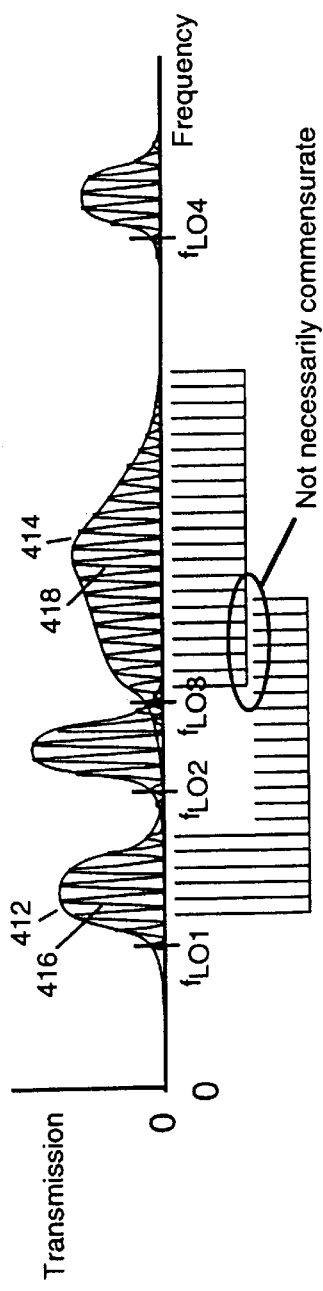
FIG. 18B shows irregular channel bandshapes, frequency locations and non-commensurate comb-filter peaks.

The sharing of reference frequencies causes the velocimetry measurement to be insensitive to the choice of specific values for reference frequencies. Furthermore, the detailed band shapes are not critical provided "A" and "B" units have similar shapes within each channel. FIG. 18B shows a hypothetical set of channel bandshapes for one of the units, suggesting arbitrary placement and shape. The lack of commensuration between the comb-filter peaks 416 and 418 inside bands 412, 414 suggests lack of phase-linearity. Provided both "A" and "B" units deviate from phase-linearity in the same manner, lack of phase-linearity is acceptable. Also note that it is not critical for the channel bands to contiguously fill the input bandwidth $\beta_{net}$ in this application, although it is optimal to do so to produce the least ambiguous autocorrelation peaks.

A correlator sharing reference frequencies

Figure 19B:
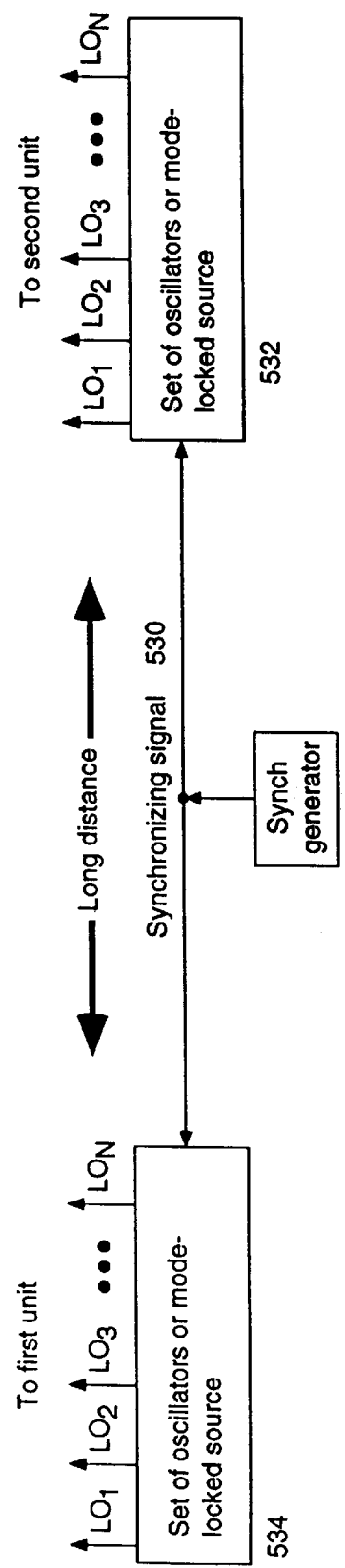
FIG. 19B shows synchronization of reference signals for two widely separate multiheterodyning units.
Figure 19A:
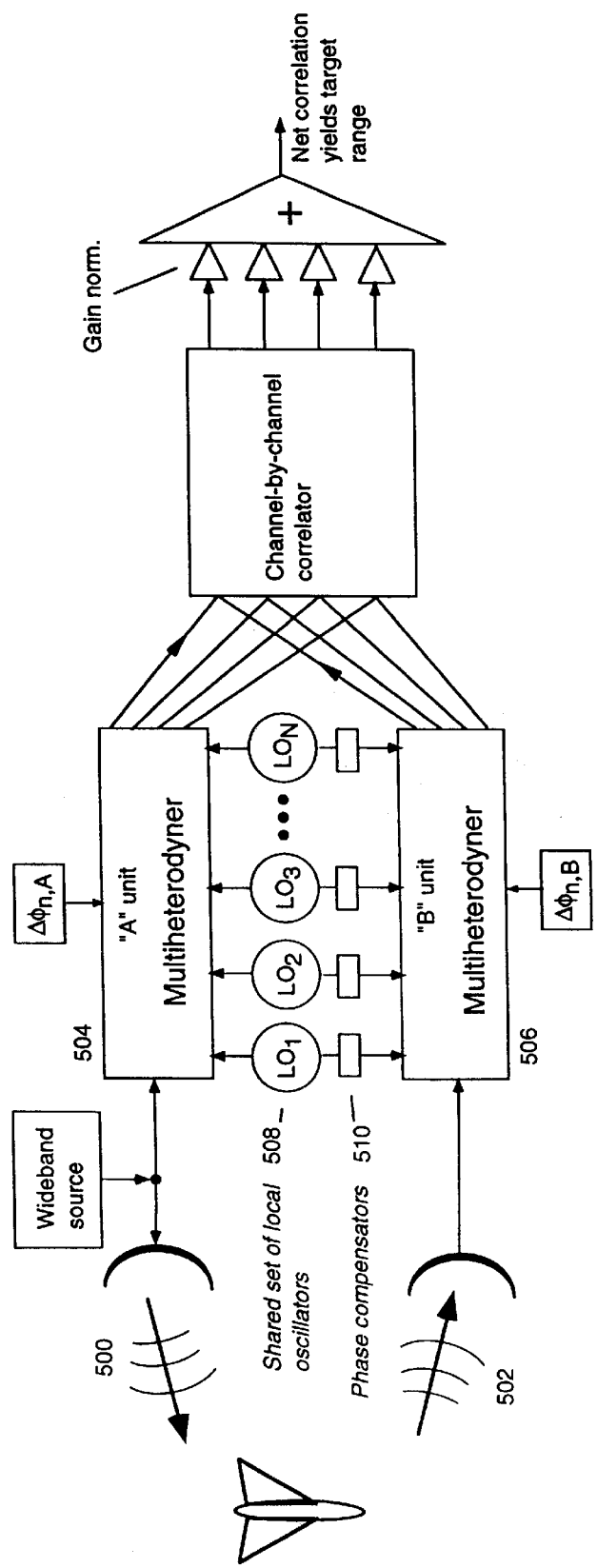
FIG. 19A shows a correlator using two matched multiheterodyning units sharing reference frequencies.

FIG. 19A shows an embodiment of the invention performing correlation, where a set of reference frequencies $f_{LOn}$ are shared. This application correlates two wide bandwidth input signals 500, 502 for the purpose of range-finding, analogous to FIG. 2B. Each input signal is spectrally decomposed into channels and heterodyned by the set of reference frequencies in the multiheterodyner units 504, 506. When a set 508 of reference frequencies are shared, as shown in FIG. 19A, this creates the practical advantage that the detailed value of the reference frequencies is immaterial, analogous to the case with the double interferometer velocimeter discussed above. Thus the bandshapes (for each channel pair A, B) and reference frequencies could be arbitrarily arranged. On a coarse scale it is optimal to avoid overlapping channel bandshapes, and optimal to fill the input bandwidth $\beta_{net}$ contiguously. But on a detail level the particular frequencies chosen do not matter.

Phase compensators 510 placed in series with the reference signals are analogous to 795 in FIG. 17, and control differences in arrival time for reference signals from the sources 508 to each apparati 504, 506.

Synchronizing widely spaced correlator units

If the separate multiheterodyning apparati 504, 506 of a correlator are spaced far apart, such as in radio astronomy or long-baseline optical interferometry, then it may not be practical to communicate the set of reference frequencies via a set of numerous cables. And even if the reference frequencies are combined into a single reference signal, such as produced by a mode-locked oscillator, frequency dependent attenuation or dispersion may make it difficult to communicate a wideband reference signal over long distance. A solution is to use two sets of local oscillators that are synchronized by cable 530, as shown in FIG. 19C. The synchronization signal could have a narrow bandwidth to accommodate the best frequency for the long distance cable. The synchronizing signal also could be expressed as an optical signal in the infrared where optical fibers have a minimum attention. The synchronizing signal could be used to synchronize two mode-lock oscillators, one at station 532 and one at 534, providing the two sets of reference frequencies. Alternatively, the synchronizing signal could be from an external source that is accessible to both stations, such as a satellite or similar distant source.

Correlator for optical signals

Figure 5:
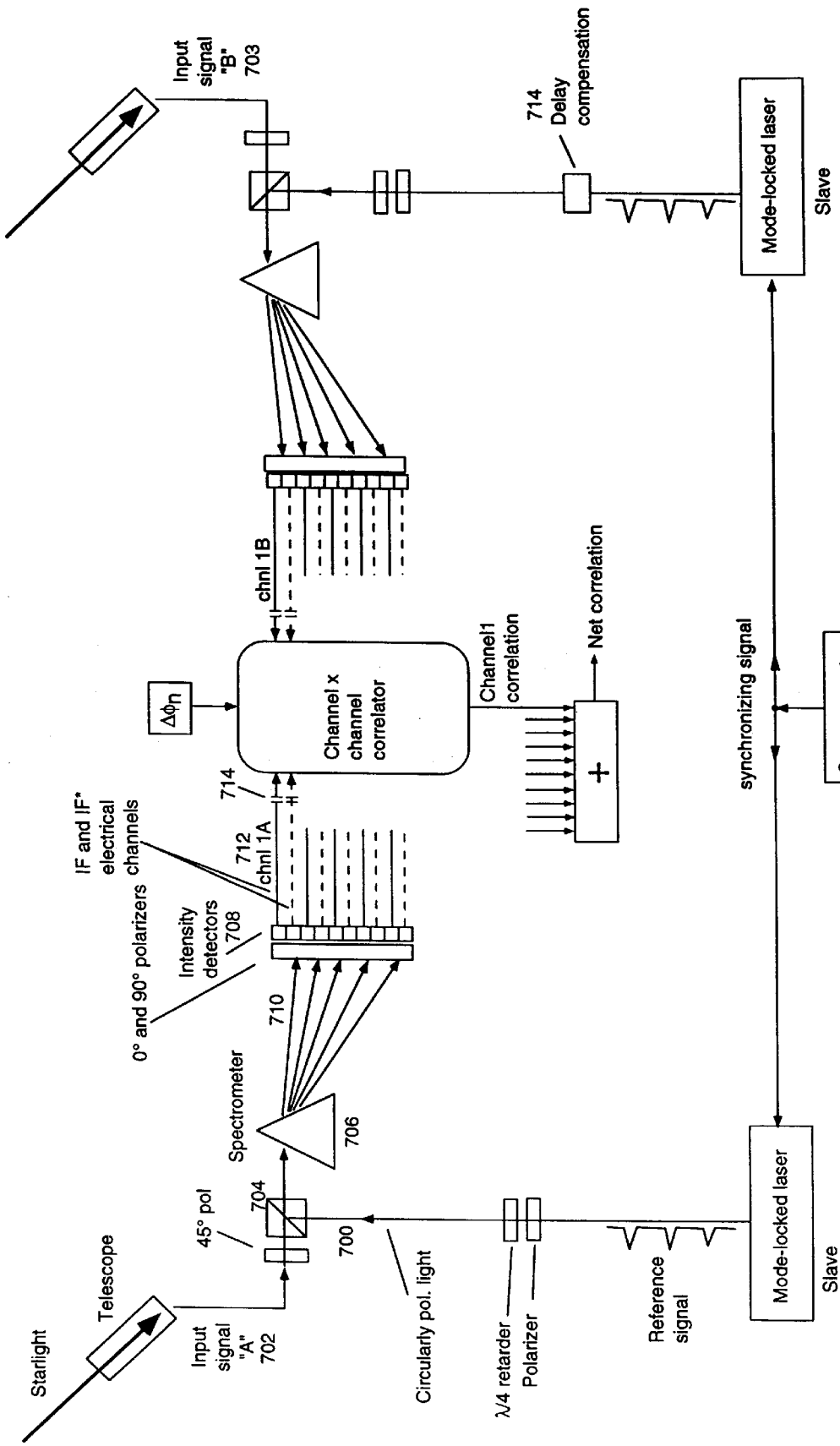
FIG. 5 shows an optical embodiment of a multiheterodyning correlator.

FIG. 5 shows a multiheterodyning correlator for optical signals "A" 702 & "B" 703. Reference signal 700 is added to the input signal A (702) with a beamsplitter 704 prior to the spectrometer 706, symbolized by the prism. The spectrometer could comprise a prism or a grating. The input angle of the reference beam into the prism or grating may have to be slightly different than that of the input beam so that the reference and beam fall upon the same intensity detector element 708 when the reference frequency is lower or higher than the portion of the input signal it will heterodyne. The intensity detector produces an electrical signal 712 in response to the difference frequency component between the input signal 710 and $f_{LO}$ contained in reference beam 700. (The terms "power" and "intensity" can be interchanged because the area of the intensity detecting device is constant.)

Figure 6:
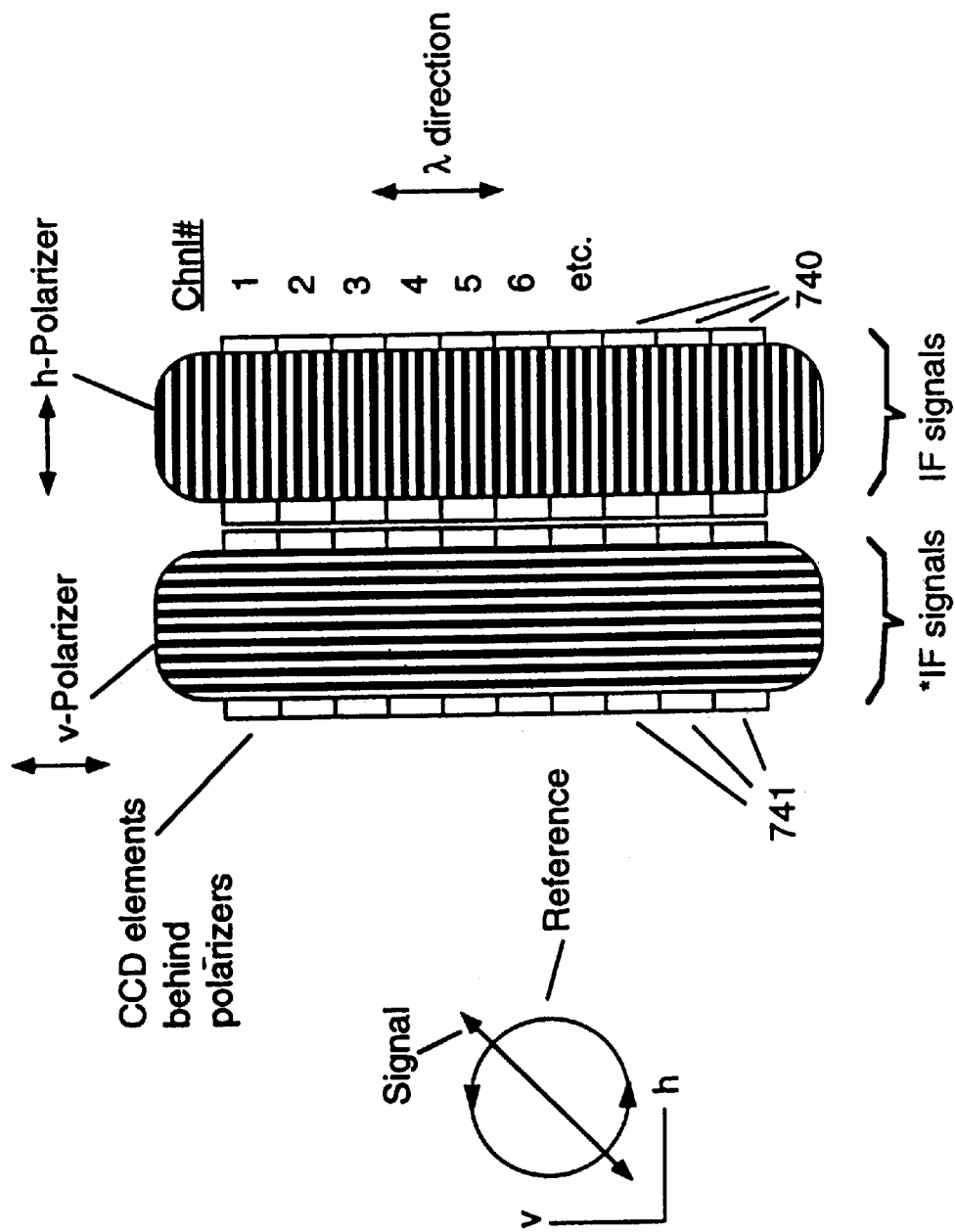
FIG. 6 shows the orientation of polarizers before the intensity detectors of the spectrometer in the optical correlator of FIG. 5.

FIG. 6 shows a detail of the intensity detectors in the spectrometer of FIG. 5. The intensity detectors could be elements of a CCD detecting array. A column 740 of elements would be responsible for detecting the IF signals and another column 741 responsible for the quadrature signal *IF. Rows of detectors would be associated with specific channel and with a specific range of wavelengths (frequencies). Let there be two polarization directions "h" and "v" also called horizontal and vertical. The input signal 702 is arranged to be polarized at 45° to "h" so that there is intensity in both the "h" and "v" components, and the reference signal is arranged to be circularly polarized (or vice versa). A horizontal polarizer precedes the IF intensity detectors and a vertical polarizer before the *IF detectors. This way the *IF detectors see a combined beam where the reference component lags 90° behind relative to the IF beam. The DC component of the intensity signal can be blocked by capacitor-like elements 714, analogous to those labeled 757 in FIG. 7A.

Changes and modifications in the specifically described embodiments can be carried out without departing from the scope of the invention, which is intended to be limited by the scope of the appended claims.

The invention claimed is:

1. A method for applying a signal process to a high bandwidth input signal to produce an output signal, comprising:

decomposing said high bandwidth input signal into a plurality of spectral bands, wherein each spectral band of said plurality of spectral bands has a smaller bandwidth than said high bandwidth signal;

down-heterodyning each said spectral band to create an intermediate frequency signal by beating each said spectral band against a reference signal or against a component of said reference signal, wherein said reference signal comprises a plurality of reference frequency components, wherein each reference frequency component of said plurality of reference frequency components comprises a unique frequency with respect to every other reference frequency component, wherein for each said spectral band there is a specific reference frequency component having a frequency close to said spectral band, wherein the set of said intermediate frequency signals and their subsequent processing path is called a set of channels;

applying a signal process to each said intermediate frequency signal to produce a set of channel output signals; and summing said channel output signals to produce said output signal, wherein this method is called "multi-channel heterodyning" or "multiheterodyning".

2. The method of claim 1, further comprising up-heterodyning the frequency of said channel output signals prior to the step of summing said channel output signals to produce said output signal.

3. The method of 2, wherein the step of up-heterodyning is performed using the same said reference frequency components.

4. The method of claim 1, wherein the effective spectrum of said signal process applied to said intermediate frequency signal is shifted in frequency by an amount individual to said channel and said amount can be expressed as a phase shift and is called a channel phase shift, wherein said channel phase shift is applied in a coordinated manner to many channels to modify the effective temporal behavior of said output signal.

5. The method of claim 4, wherein said coordinated manner includes having a component of said channel phase shift that causes the effective temporal behavior of said output signal to change by amount $\Delta t$, wherein said component is given by approximately the product of the average frequency of said spectral band associated with said channel times said amount $\Delta t$.

6. The method of claim 4, wherein said coordinated manner includes having a component of said channel phase shift that brings said output into phase-linearity, wherein said component for said channel is given by approximately the product of said reference signal frequency component for said channel times an average over all said channels of the delay time characteristic of said signal process for said channel.

7. The method of claim 4, wherein said channel phase shift is accomplished by phase shifting said intermediate frequency signal by an amount which is independent of frequency and called a rotation angle to produce a phase shifted intermediate frequency signal, wherein said phase shifted intermediate frequency signal is called a rotated signal, wherein said channel output is formed from combinations of undelayed and delayed replicas of said intermediate signal having user-selected amplitudes, delay values and said rotation angles, wherein said rotation angle is proportional to said channel phase shift and proportional to said delay values.

8. The method of claim 4, wherein said channel phase shift is accomplished by expressing said intermediate frequency signal as a vector signal comprising said intermediate frequency signal and a quadrature manifestation of said intermediate signal, wherein said quadrature manifestation of a signal is defined as that having a phase approximately 90 degrees different from said signal for all its component frequencies, wherein said vector signal is rotated in its vector space by an angular amount called a rotation angle; wherein said channel output is formed from combinations of undelayed and delayed replicas of said vector signal having user-selected amplitudes, delay values and said rotation angles, wherein said rotation angle is proportional to said channel phase shift and proportional to said delay values.

9. The method of claim 8, wherein said vector rotation is produced from a linear combination of said quadrature and non-quadrature vector components using coefficients which are sinusoidal functions of said rotation angle in analogy to a mathematical rotational transformation.

10. The method of claim 4, wherein said phase shift is achieved for a given said channel by substituting for said intermediate frequency signal in said signal process said intermediate frequency signal or quadrature version of said intermediate signal in different combinations to form a set of intermediate outputs, wherein said channel output is formed from linear combinations of said set of intermediate outputs using coefficients which are sinusoidal functions of an angular amount which is proportional to said phase shift.

11. The method of claim 4, wherein said input signal is an optical wave, wherein said reference signal and said input signal in said spectral band comprise two beams, wherein one of said two beams is circularly polarized relative to the other of said two beam, wherein both beams are detected by a first intensity detector sensitive to linear polarization, wherein both beams are passed through a first polarizer preceding said intensity detector, wherein said non-quadrature component is obtained by passing both beams through a second polarizer oriented orthogonal to said first polarizer.

12. The method of claim 1, wherein said signal process is any process which can be Fourier decomposed and widely separated frequency components are independent of each other, wherein said independence means that the relationship between detailed phases of said widely separated frequency components does not affect said signal process.

13. The method of claim 1, wherein said signal process is selected from a group consisting of a time delay process, a filtering process, an interferometry process, an autocorrelation process and a recording process, wherein said intermediate frequency signal is called an input signal and said channel output signal is called an output signal, wherein said output signal of said time delay process is a delayed replica of said input signal, wherein said output signal of said filtering process comprises one or more delayed replicas of said input signal with an undelayed replica of said input signal, wherein said interferometry process is said filtering process, wherein said one or more delayed replicas of said input signal are optimally spaced with the same interval, wherein said output signal of said autocorrelation process includes time averaging the product of said input signal with a delayed replica of said input signal and includes time averaging the square of the output of said interferometry process, wherein said output signal of said recording process includes storage and less than real-time manifestation of said input signal which may be in vector form, wherein the phase and amplitude of said input signal is stored while simultaneously measuring the relative phase and amplitudes of said multiple frequency components of said reference signal.

14. The method of claim 1, wherein said signal process is a waveform synthesis process, wherein said channel output signal is an ersatz form of said input signal, wherein said ersatz form includes stored data, noise generators, and real-time signals having bandwidth comparable to typical said intermediate frequency signal.

15. The method of claim 1, wherein said input signal comprises at least two separable signals which are to be processed by a multiple input signal process, wherein said multiple input signal process includes correlation, wherein said spectral decomposition and said down-heterodyning occur using separate apparatus to produce separate intermediate frequency signals, wherein each said separate apparatus shares said reference signal frequency components, wherein said separate intermediate frequency signals are correlated in a channel-by-channel parallel fashion organized by said reference frequencies.

16. The method of claim 1, wherein said signal process is a correlation of at least two intermediate frequency signals, called input signals, derived from said spectral bands having similar average frequencies and said down-heterodyning performed using the same said reference signal component frequency, wherein a correlation for two said input signals is based on the time averaged product of said two input signals, wherein a correlation for more than two input signals includes a user-defined function that maximizes when all said input signals are replicas of each other, wherein a multiple input correlation includes time averaging the square of the sum of all said inputs.

17. The method of claim 1, wherein said signal process is a combination of signal processes selected from a group consisting of interferometry, filtering, autocorrelation, correlation, delay, recording, waveform synthesis, and arithmetic summing and subtraction of signals.

18. The method of claim 1, wherein the precise value of said reference signal component frequencies may be arbitrary and unrelated to each other, wherein it is optimal that the coarse value of said reference signal components frequencies and average frequency of said spectral bands be evenly positioned across the bandwidth of said input signal.

19. The method of claim 1, wherein said spectral bands are sparsely placed across the bandwidth of said input signal.

20. The method of claim 1, wherein said input signal includes electromagnetic waves and sound.

21. The method of claim 20, wherein said input signal includes visible and invisible light.

22. The method of claim 4, wherein said input signal is an optical wave, wherein said reference signal and said input signal in said spectral band comprise two beams, wherein for a first polarization direction one of said two beams is retarded by a quarter wave relative the other said beam and relative to a second polarization direction orthogonal to said first polarization, wherein intensity of said two beams in said first polarization direction is detected to form said intermediate frequency signal, wherein intensity of said two beams in said second polarization direction is detected to form said quadrature intermediate frequency signal.

23. The method of claim 10, wherein one of said two beams is circularly polarized relative to other beam of said two beams, wherein said other beam is linearly polarized at 45 degrees to said first polarization direction.

24. The method of claim 14, wherein said signal process is the generation of a wideband signal having echoes, wherein for each said channel a waveform is generated which then passes through an interferometer to form said channel output.

25. The method of claim 7, wherein said intermediate frequency signal is phase shifted by retarding said intermediate frequency signal.

26. The method of claim 7, wherein said intermediate frequency signal is phase shifted by retarding said input signal in spectral band relative to said reference signal component.

27. The method of claim 8, wherein rotation of said vector is accomplished by retarding said input signal in spectral band relative to said reference frequency component.

28. The method of claim 8, wherein rotation of said vector is accomplished through linear combination of its vector components.

* * * * *